(12) United States Patent
Fullerton

(10) Patent No.: US 8,292,022 B2
(45) Date of Patent: Oct. 23, 2012

(54) SYSTEM AND METHOD FOR GENERATING AND CONTROLLING CONDUCTED ACOUSTIC WAVES FOR GEOPHYSICAL EXPLORATION

(75) Inventor: Larry W. Fullerton, New Hope, AL (US)

(73) Assignee: Soundblast Technologies LLC, Winter Park, FL (US)

( * ) Notice: Subject to any disclaimer, the term of this patent is extended or adjusted under 35 U.S.C. 154(b) by 1559 days.

(21) Appl. No.: 11/785,327

(22) Filed: Apr. 17, 2007

(65) Prior Publication Data
US 2012/0181103 A1    Jul. 19, 2012

Related U.S. Application Data

(60) Provisional application No. 60/792,420, filed on Apr. 17, 2006, provisional application No. 60/850,685, filed on Oct. 10, 2006.

(51) Int. Cl.
*G01V 1/00* (2006.01)

(52) U.S. Cl. ........ 181/101; 181/117; 181/118; 102/355; 89/7

(58) Field of Classification Search .......... 181/101, 181/117, 118; 89/7; 102/355, 363, 403
See application file for complete search history.

(56) References Cited

U.S. PATENT DOCUMENTS

| | | | |
|---|---|---|---|
| 2,994,397 A | 8/1961 | Huckabay et al. | |
| 3,048,816 A | 8/1962 | Lubnow | |
| 3,064,753 A | 11/1962 | McClure | |
| 3,099,813 A | 7/1963 | Anderson | |
| 3,233,694 A | 2/1966 | Roever | |
| 3,235,026 A | 2/1966 | Hoffman | |
| 3,410,142 A | 11/1968 | Diaber et al. | |
| 3,412,394 A | 11/1968 | Lewis et al. | |
| 3,828,886 A | 8/1974 | Holloway | |
| 3,897,195 A | 7/1975 | Finch | |
| 4,043,420 A | 8/1977 | Zens et al. | |
| 4,356,753 A | 11/1982 | Galley | |

(Continued)

FOREIGN PATENT DOCUMENTS

GB    934749    8/1963

(Continued)

OTHER PUBLICATIONS

International Search Report dated Apr. 24, 2008 Issued in International Application No. PCT/US2007/09441.

(Continued)

*Primary Examiner* — Forrest M Phillips
(74) *Attorney, Agent, or Firm* — Venable LLP; Robert S. Babayi; Christopher Ma

(57) ABSTRACT

An improved system and method for generating and controlling conducted acoustic waves for geophysical exploration are provided. A plurality of overpressure waves are generated by at least one overpressure wave generator comprising at least one detonation tube having an open end. The at least one overpressure wave generator is oriented so the plurality of overpressure waves are not directed directly towards a target media. The recoil force of the at least one overpressure wave generator occurring during generation of the plurality of overpressure waves is coupled to the target media to generate conducted acoustic waves. The timing of the generation of the plurality of overpressure waves can be in accordance with a timing code and can be used to steer the conducted acoustic waves to a location of interest in the target media.

20 Claims, 15 Drawing Sheets

U.S. PATENT DOCUMENTS

| | | | |
|---|---|---|---|
| 4,642,611 A | | 2/1987 | Koerner |
| 4,662,844 A | | 5/1987 | Gallagher et al. |
| 4,664,631 A | | 5/1987 | Pederson et al. |
| 4,741,154 A | | 5/1988 | Eidelman |
| 5,345,758 A | | 9/1994 | Bussing |
| 5,430,691 A | | 7/1995 | Fridman |
| 5,473,885 A | | 12/1995 | Hunter, Jr. et al. |
| 5,513,489 A | | 5/1996 | Bussing |
| 5,579,633 A | | 12/1996 | Hunter, Jr. et al. |
| 5,644,314 A | | 7/1997 | Ahmad et al. |
| 5,800,153 A | * | 9/1998 | DeRoche ............... 431/1 |
| 5,855,827 A | | 1/1999 | Bussing et al. |
| 5,864,517 A | | 1/1999 | Hinkey et al. |
| 5,873,240 A | | 2/1999 | Bussing et al. |
| 5,937,635 A | | 8/1999 | Winfree et al. |
| 5,973,999 A | | 10/1999 | Naff et al. |
| 6,003,301 A | | 12/1999 | Bratkovich et al. |
| 6,062,018 A | | 5/2000 | Bussing |
| 6,360,173 B1 | | 3/2002 | Fullerton |
| 6,408,614 B1 | | 6/2002 | Eizenhöfer |
| 6,813,878 B2 | | 11/2004 | Kraft |
| 6,928,804 B2 | | 8/2005 | Venkataramani et al. |
| 7,007,455 B2 | | 3/2006 | Kraft |
| 7,093,794 B2 | | 8/2006 | Leyva et al. |
| 7,100,377 B2 | | 9/2006 | Kraft |
| 7,797,110 B2 | * | 9/2010 | Shin ............... 702/11 |
| 7,841,982 B2 | * | 11/2010 | Johnson et al. ............. 600/437 |
| 7,882,926 B2 | | 2/2011 | Fullerton |
| 7,944,774 B2 | * | 5/2011 | Monk et al. .......... 367/21 |
| 2005/0103022 A1 | | 5/2005 | Kraft |
| 2005/0125933 A1 | | 6/2005 | Hochstein, Jr. et al. |
| 2007/0199382 A1 | * | 8/2007 | Sakai ............... 73/645 |

FOREIGN PATENT DOCUMENTS

| | | |
|---|---|---|
| GB | 1 269 123 | 4/1972 |
| JP | 59-56023 | 4/1984 |
| RU | 2 084 675 C1 | 7/1997 |
| RU | 2 130 597 C1 | 5/1999 |
| RU | 2 188 084 C2 | 8/2002 |
| RU | 36135 | 2/2004 |
| SU | 1716253 A1 | 2/1992 |
| WO | WO-94/22559 | 10/1994 |
| WO | WO-99/09355 A1 | 2/1999 |

OTHER PUBLICATIONS

Written Opinion of the International Searching Authority dated Apr. 24, 2008, Issued in International Application No. PCT/US2007/09441.

Nicholls, J.A. et al., "Intermittent detonation as a thrust-producing mechanism," Engineering Research Institute, University of Michigan, Jan. 1954.

Van Wingerden, K. et al., "Detonations in pipes and in the open," Christian Michelsen Research, Bergen, Norway, Nov. 1999.

Kelly, J., "After Combustion: Detonation," Popular Science, Sep. 2003.

Lu, F.K. et al., "Experimental study of a pulse detonation rocket with Shchelkin spiral," Aerodynamics Research Center, University of Texas at Arlington, TX 76019, USA, pp. 1-6.

International Search Report dated Sep. 10, 2008 issued in International Application No. PCT/US07/09442.

Written Opinion of the International Searching Authority dated dated Sep. 10, 2008, issued in International Application No. PCT/US07/09442.

Notification of Transmittal of the International Search Report and the Written Opinion of the International Searching Authority, or the Declaration dated Sep. 10, 2008, issued in related International Appln. No. PCT/US07/09442.

Office Action dated Mar. 29, 2010, issued in related U.S. Appl. No. 11/785,320.

International Search Report dated Sep. 10, 2008, issued in related International Appln. No. PCT/US07/09444.

Written Opinion of the International Searching Authority dated Sep. 10, 2008, issued in related International Appln. No. PCT/US07/09444.

Office Action dated Aug. 4, 2011, issued in related U.S. Appl. No. 13/015,876.

Russian Decision on Grant dated Jun. 15, 2011, issued in related Russian Patent Application No. 2008145048/07(058826), and an English-language translation.

Russian Decision on Grant received Jul. 29, 2011, issued in related Russian Patent Application No. 2008145045/07(058823), and an English-language translation.

* cited by examiner

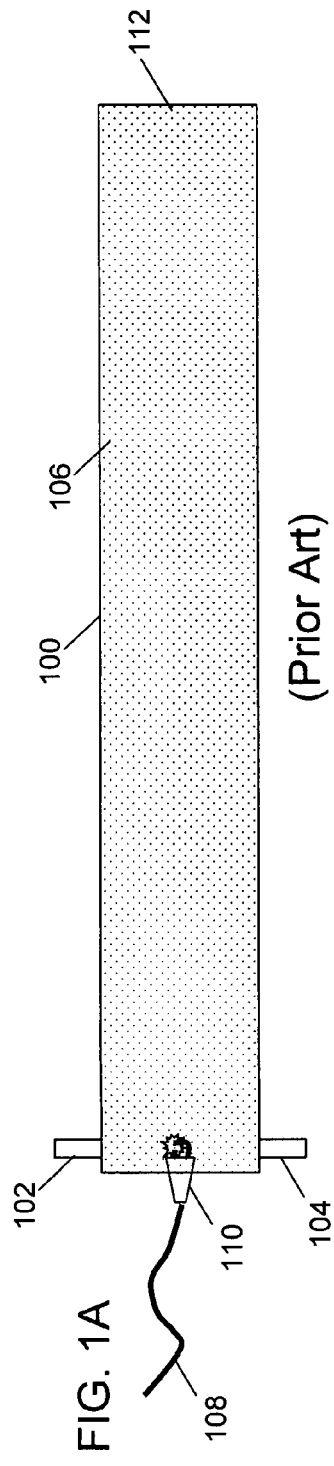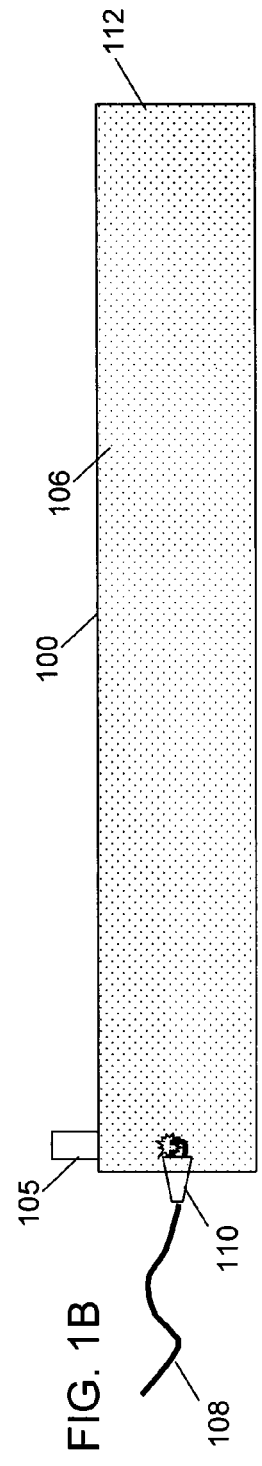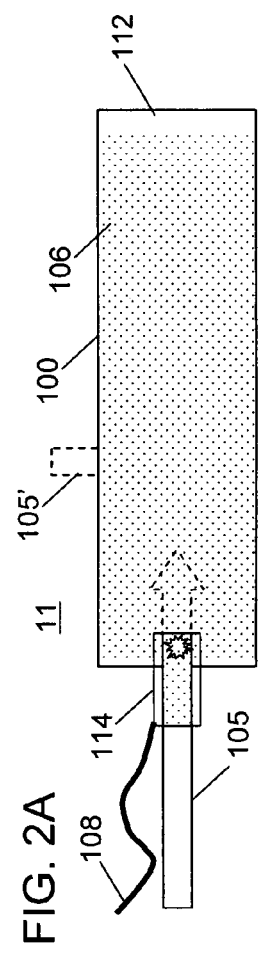

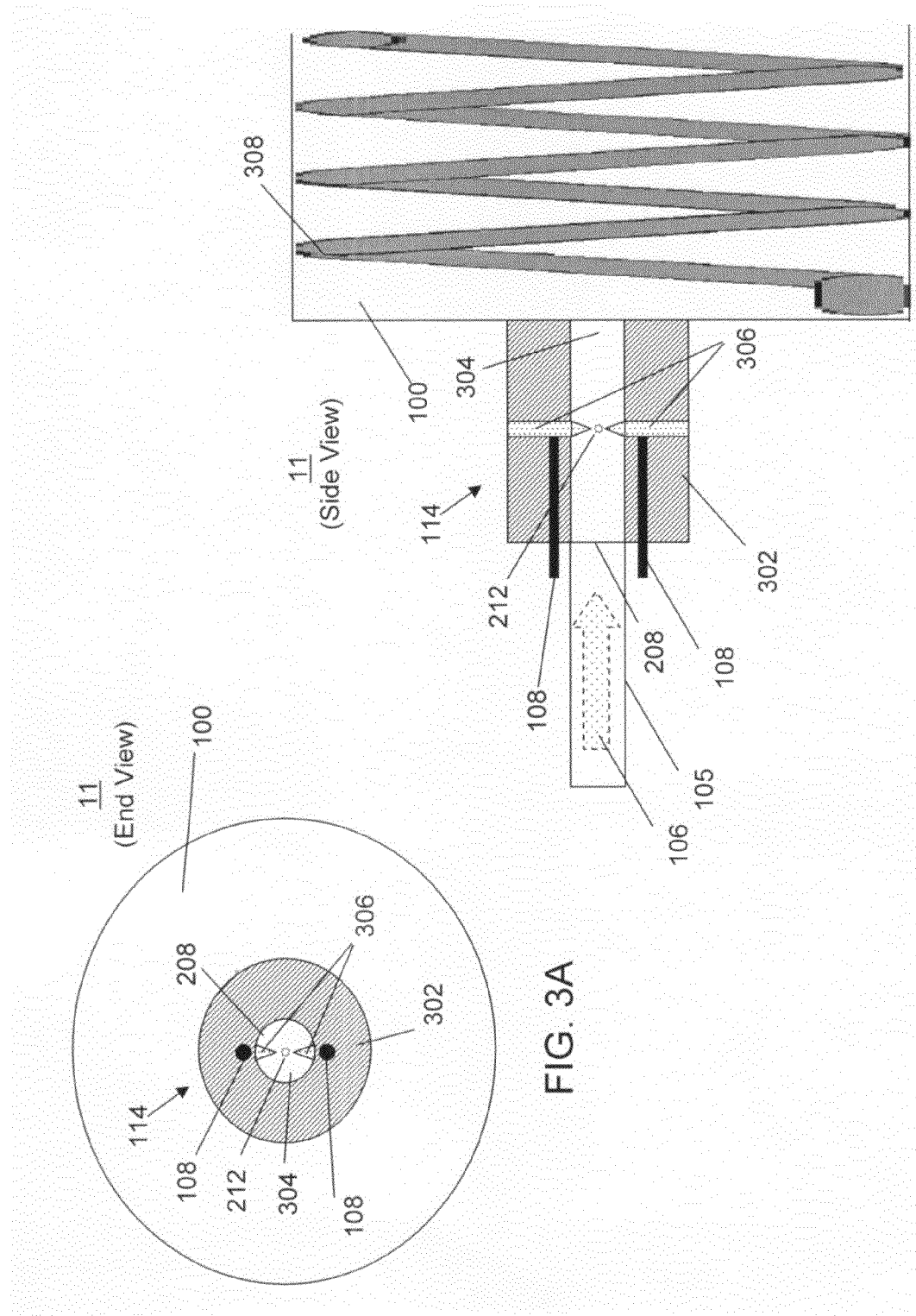

702

704

706

708

710

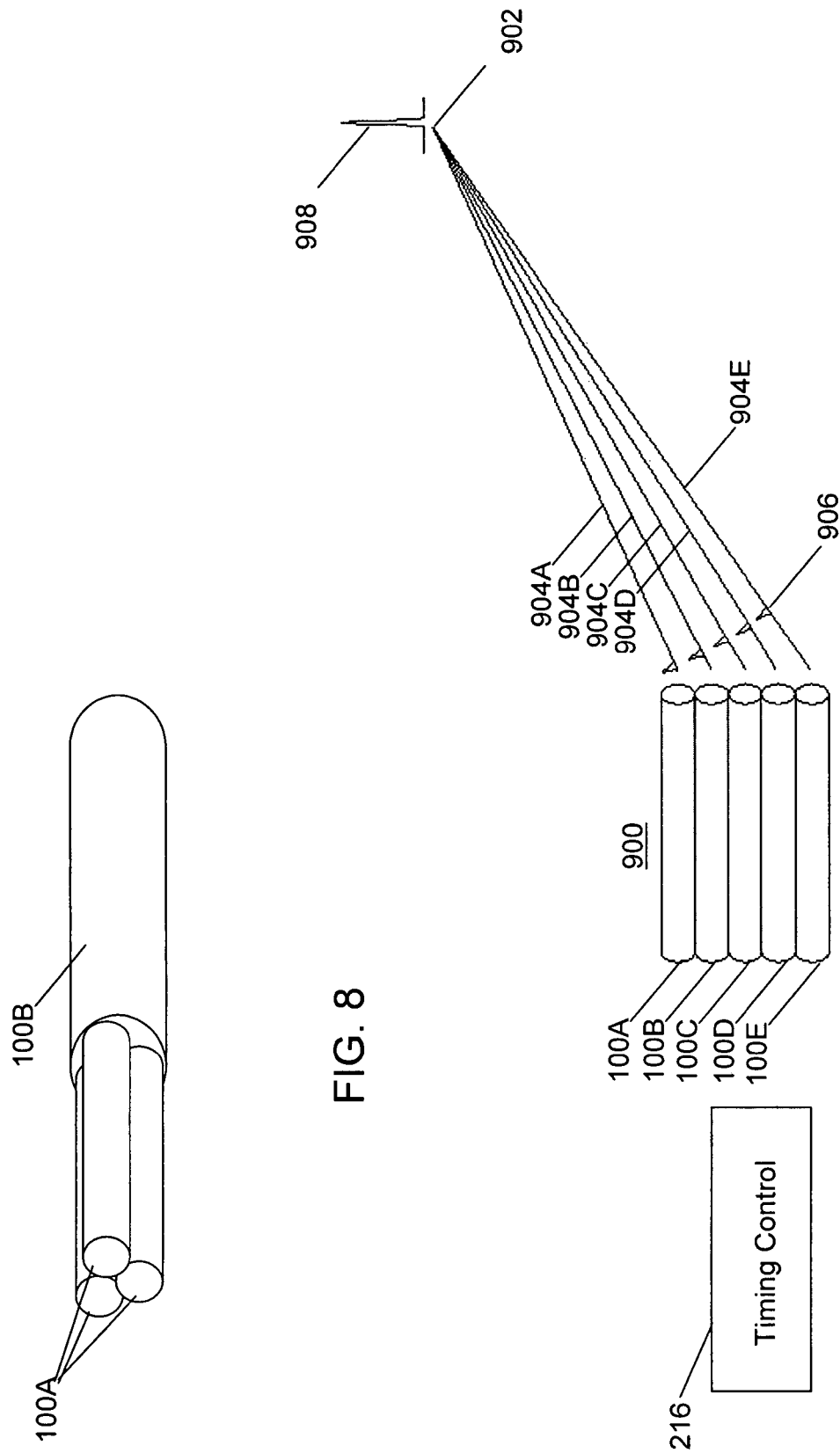

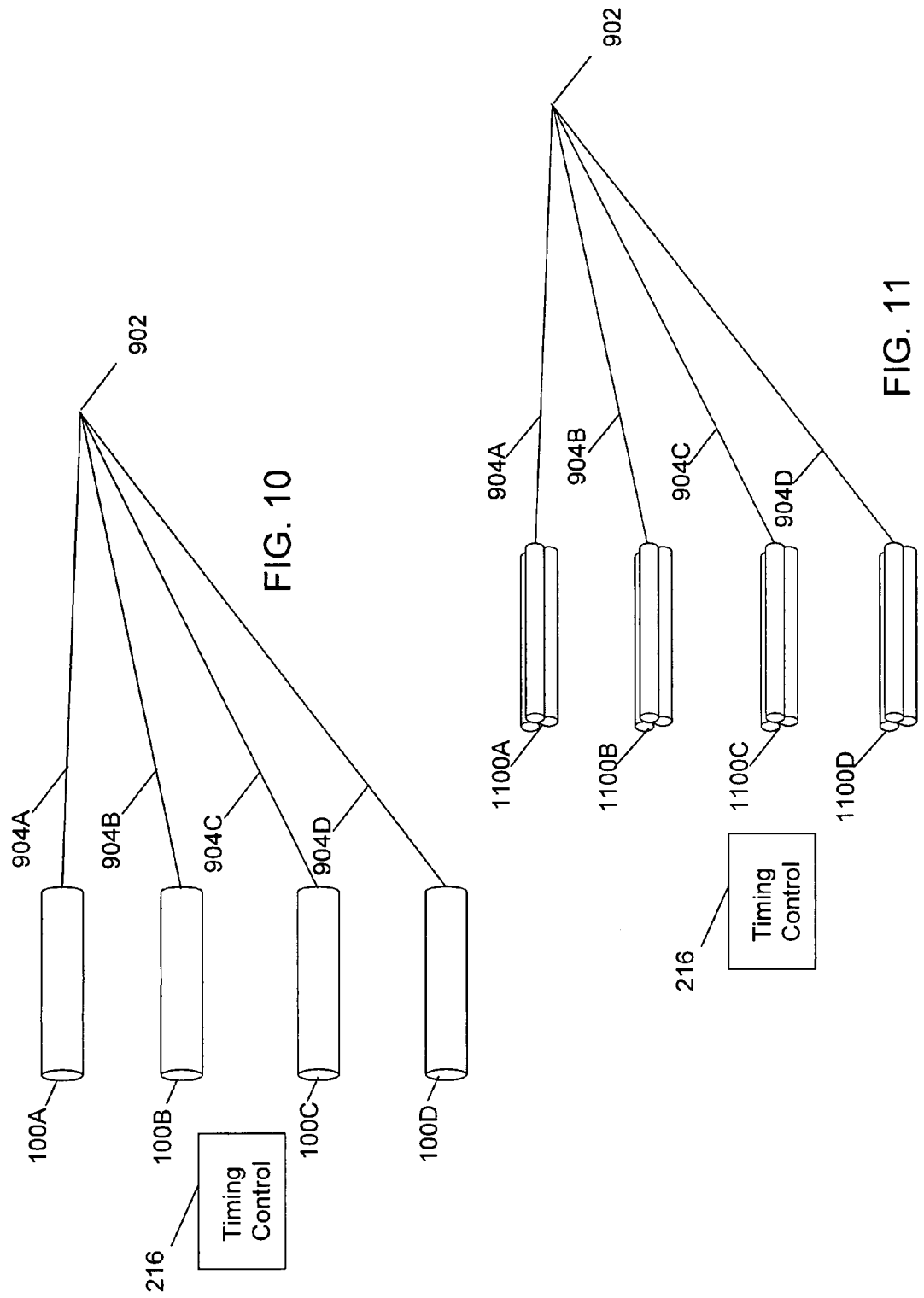

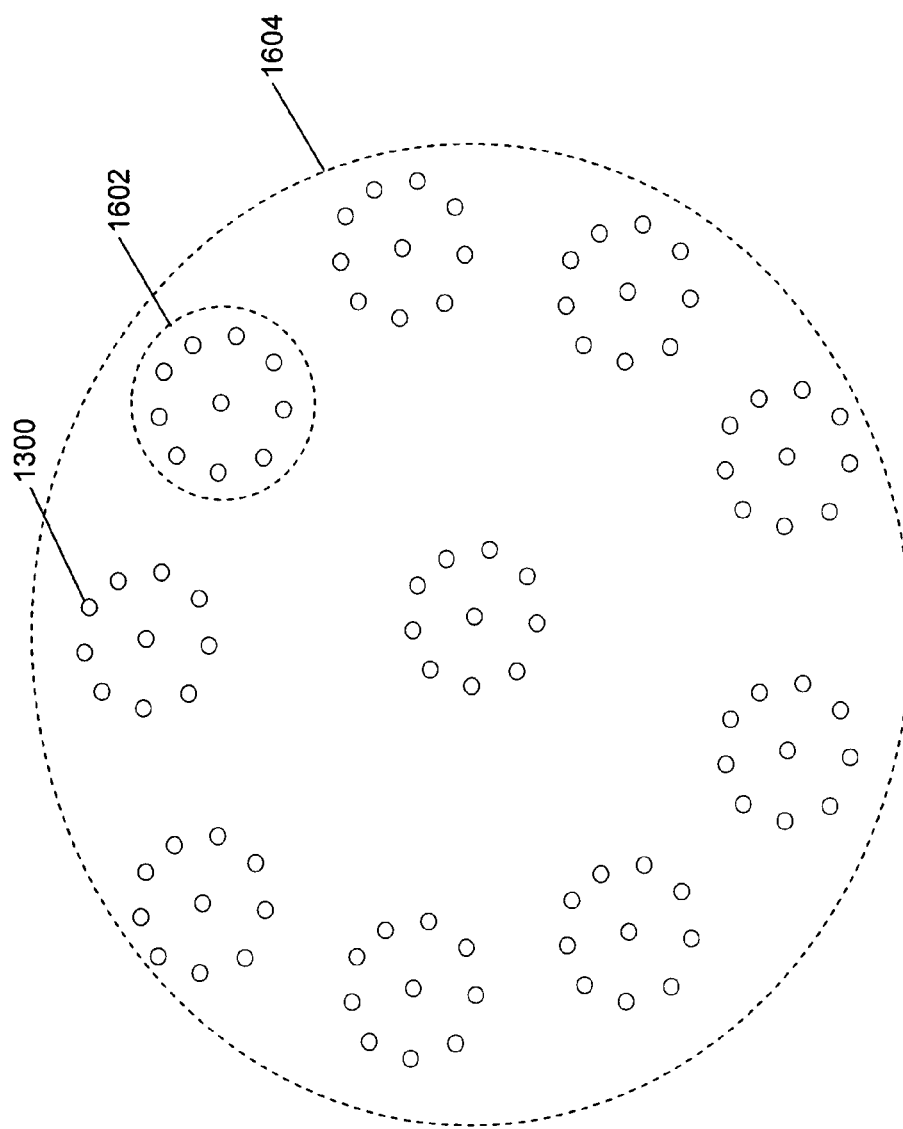

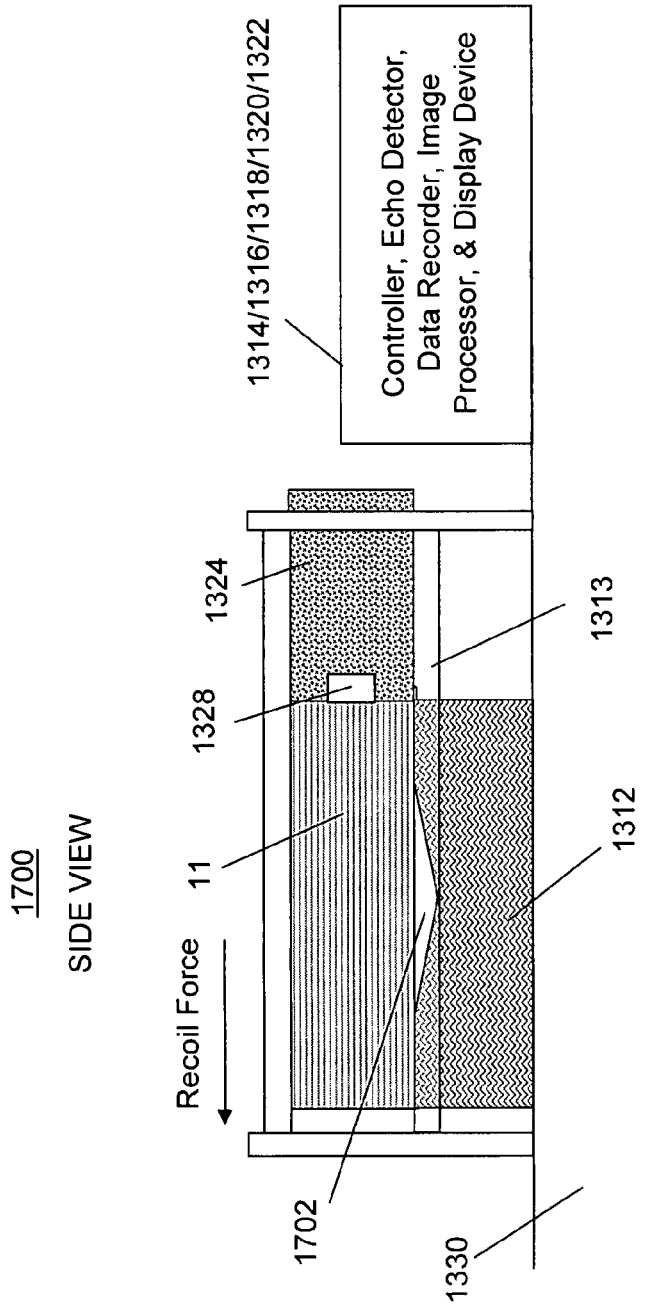
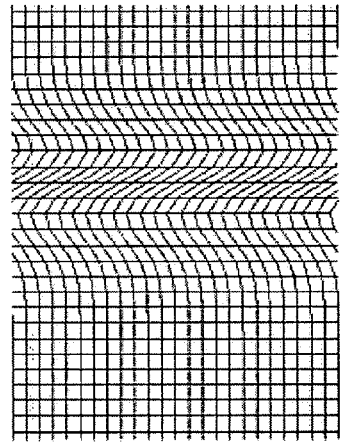
FIG. 17A
FIG. 17B

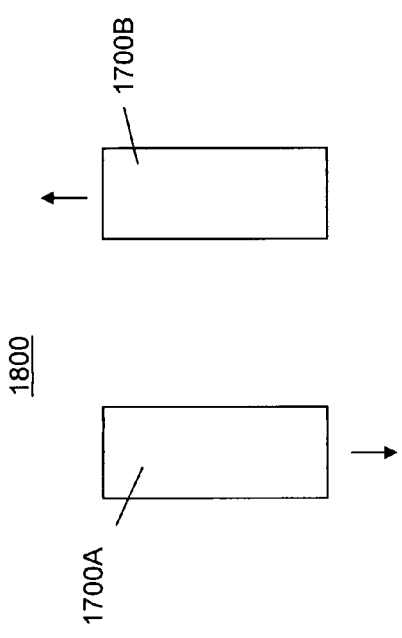
FIG. 18A
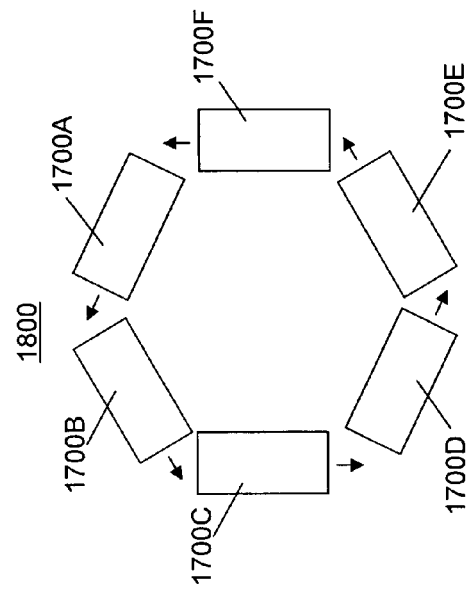
FIG. 18B
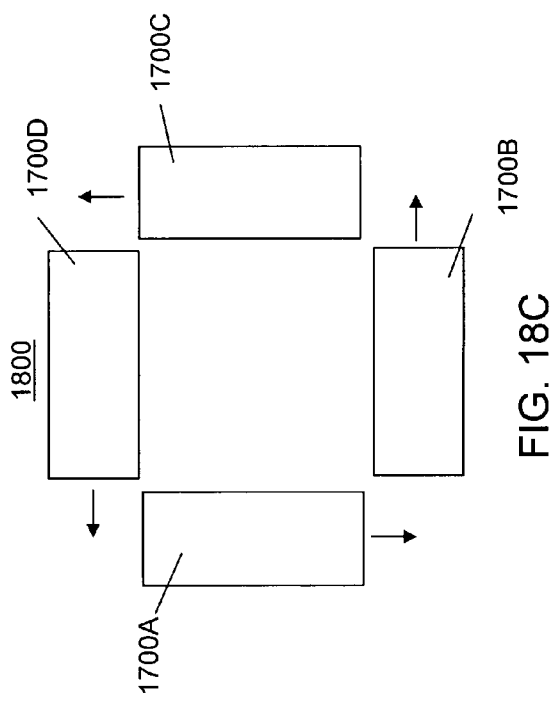
FIG. 18C
FIG. 18D

SYSTEM AND METHOD FOR GENERATING AND CONTROLLING CONDUCTED ACOUSTIC WAVES FOR GEOPHYSICAL EXPLORATION

CROSS REFERENCE TO RELATED APPLICATIONS

This application claims priority to U.S. Provisional Patent Application 60/792,420, filed Apr. 17, 2006, and U.S. Provisional Patent Application 60/850,685, filed Oct. 10, 2006, both of which are incorporated herein by reference. This application is also related to a U.S. Provisional Patent Application filed concurrently on Oct. 10, 2006, titled "A System and Method for Generating and Directing Very Loud Sounds".

FIELD OF THE INVENTION

The present invention relates generally to a system and method for generating and controlling an overpressure wave. More particularly, the present invention relates to controlling the detonation of a fuel-oxidant mixture flowing within a tubular structure to generate, steer and focus an overpressure wave. The present invention also relates to a system and method for coupling the recoil force, namely, the backward or reactive force produced by the generation of the overpressure wave, to a target media in order to produce a conducted acoustic wave that can be used to explore or otherwise characterize a region of interest within the target media. More particularly, the present invention also relates to controlling the recoil force caused by the detonation of a fuel-oxidant mixture flowing within one or more tubular structures to generate and control conducted acoustic waves for geophysical exploration purposes.

BACKGROUND OF THE INVENTION

An overpressure wave is a transient air pressure, such as the blast wave from an explosion, which is greater than the surrounding atmospheric pressure. Such overpressure waves originate at the point of detonation of the explosion and typically propagate outward from the point of detonation in all directions. Such explosions may also involve the release of intense heat.

Various methods are often employed to cause an overpressure wave to be directed in a desired direction. For example, directed charge methods might involve placement of an explosive against an object capable of sustaining the blast (e.g., a thick concrete structure) so that the energy of the explosion will be directed outward from the object. Similarly, various methods of 'shaped charges' are used to cause the majority of the energy of an explosion to be directed in a desired direction. Similarly, blast barriers such as concrete walls or earthen berms are often used to redirect the energy of potential explosions away from valuable assets such as buildings. Great Britain patent GB 1,269,123 describes detonation of ethylene and oxygen in combustion tubes and use of the detonation wave for coating, to drive a turbine engine, and for rocket propulsion. U.S. Pat. Nos. 4,662,844 and 4,664,631 describe igniting fuel and oxidizer mixtures within combustion chambers to produce a detonative combustion wave to simulate weapons effects. U.S. Pat. No. 5,864,517 describes a pulsed combustion acoustic wave generator to produce acoustic waves that can be used for non-lethal incapacitation, impairment, or immobilization for crowd control or self defense; mine detonation; wildlife control; acoustic cleaning; and triggering avalanches. These methods are similar in that they cause an overpressure wave to be directed out of the open end of a detonation tube. As such, various methods exist for directing overpressure waves.

It is desirable, however, to have an improved system and method for generating and controlling overpressure waves for useful purposes.

Seismic shock waves introduced into the ground are often used in geophysical exploration systems. Such seismic shock waves are typically introduced, or conducted, into the ground using either explosives or a vibration coupler. The use of explosives for such purposes is dangerous, expensive, and the resulting blast is difficult to control precisely. The transportation of a vibration coupler typically requires a 5- or 10-ton truck and it is time-consuming to set up.

Great Britain Patent 934,749 discloses an acoustical generator and seismic exploring system where an open ended combustion chamber is used to generate acoustic energy pulses that are directed downward into water or at the ground and a seismic detector is used to detect reflections of the pulses for seismic surveying.

U.S. Pat. Nos. 3,235,026 and 4,043,420 describe closed detonation chambers attached to the ground via bottom plates where a detonation of a oxygen-fuel-oxidant mixture produces a shock wave that applies a compressive inpulse against each bottom plate and the surface of the earth on which it rests thus initiating a seismic wave into the subsurface. The patents disclose alternative forms of shock absorbers that cause an opening in the detonation chambers to vent exhaust fumes.

U.S. Pat. No. 5,864,517 states "by introducing sound waves into the ground and recording their reflections, scientists can determine the composition of the earth's sublayers" and that a pulsed combustion acoustic wave generator "could generate precise sound waves at exact intervals to increase the amount of information that could be gained" from geophysical exploration studies. This prior art however does not teach how such precise sound waves at exact intervals can be generated.

An alternative geophysical exploration approach invented by the present inventor and described in U.S. Pat. No. 6,360,173 uses a detonation tube as an impulsive seismic source to generate a sequence of time-coded monocycle waveforms that propagate to geophysical structures and/or properties causing the geophysical structures and/or properties to return echoes, and a sensing means for sensing data that are representative of the echoes.

It is desirable to have an improved system and method for introducing energy into the ground or another media for exploration purposes.

SUMMARY OF THE INVENTION

Briefly, the present invention is an improved system and method for generating overpressure waves having a desired magnitude. A fuel-oxidant mixture having desired combustion characteristics is introduced at a desired flow rate into a tubular structure. In one exemplary embodiment, the tubular structure comprises a detonation tube having a specified length and diameter. The flowing fuel-oxidant mixture is detonated at one end of the detonation tube by introducing a spark within the flowing fuel-oxidant mixture. A resulting detonation impulse travels the length of the detonation tube as it ignites the flowing fuel-oxidant mixture remaining within it. The combustion characteristics and the flow rate of the fuel-oxidant mixture can be selected to control the energy of the detonation impulse. One or more additional detonation tubes having graduated (i.e., larger and larger) diameters can be optionally combined with the initial detonation tube to create a graduated detonation tube combination causing the detonation impulse to be amplified as it travels through each successive detonation tube having a larger diameter Under a first exemplary embodiment of the invention, the detonation tube (or graduated detonation tube combination) has an open end from which an overpressure wave is projected in a desired direction. Under one arrangement, multiple detonation tubes (or graduated detonation tube combinations) are co-located and grouped in one of various possible configurations causing their projected overpressure waves to be combined. The value of the combined projected overpressure waves is equal to the number of detonation tubes, N, times the overpressure projected by a single detonation tube. The far-field combined power of the combined projected overpressure waves is $N^2$ times the power projected from a single detonation tube. Under an alternative arrangement, multiple individual detonation tubes (or graduated detonation tube combinations) are located in a sparse array allowing the timing of the detonations within the various detonation tubes to be controlled such that the projected overpressure waves are steered so their power combines at a desired location(s). As such, the one or more detonation tubes can be used to focus and steer the overpressure waves to produce a desired power at a desired location. Applications of the first exemplary embodiment of the invention include but are not limited to explosives emulation for training purposes, explosives barrier testing, demolition of mines/buildings, crowd control, border defense, animal/bird/insect control, prisoner control, structural strength/integrity testing, providing rotary motion to a windmill or a turbine, use as a thrust source for rocket-like propulsion, dirt/sand/snow/ice removal for roads/runways/airplanes/etc, fruit/vegetable/grain/etc. harvesting from trees/bushes/plants and comparable agriculture applications, industrial cleaning (e.g., smoke stacks/precipitators), object forming (e.g., a compliant press/molding process), fire suppression, and, in general, most any area denial/security application.

Under a second exemplary embodiment of the invention, the recoil force caused by each of a timed sequence of generated overpressure waves is coupled to a target media such as the ground, ice, or water in order to produce a sequence of conducted acoustic waves that can be used to explore a region of interest within the target media, for example, an oil deposit within the ground. Under one exemplary arrangement, the recoil force of the generated overpressure waves is coupled to the target media by a coupling component. In one embodiment, the recoil force is equal to the derivative of the backward momentum resulting from the generated overpressure waves. Under an alternative exemplary arrangement, the overpressure wave generator couples the recoil force of the generated overpressure waves directly to the target media. The sequence of conducted acoustic waves travel through the target media, reflect from the region of interest, and the corresponding reflections are received by each of a plurality of receiving devices arranged in an array. The received reflections can be processed in order to produce a three-dimensional data set characterizing the region of interest. With this embodiment, the overpressure wave may optionally be coupled into a muffling apparatus that muffles the sound associated with the overpressure wave and also damps the overpressure wave prior to its release into the surrounding environment. The coupling component of this embodiment comprises a spring-like mechanism that has damping control where the shape and material of the coupling component is selected to achieve an appropriate balance between energy transformation and adverse impact to the system (i.e., wear).

The coupling component includes an impedance plate having a desired shape, or footprint, which is in direct contact with the surface of the target media. The impedance plate couples the recoil force to the target media producing a conducted acoustic wave. As with the first exemplary embodiment, under one arrangement, multiple detonation tubes (or graduated detonation tube combinations) are co-located and grouped in one of various possible configurations causing their projected overpressure waves to be combined as previously described above, which provides for a corresponding increase in the recoil force available to be coupled to the target media. Under an exemplary alternative arrangement, multiple individual detonation tubes (or graduated detonation tube combinations) are located in a sparse array allowing the timing of the detonations within the various detonation tubes to be controlled. With this approach, the timing of conducted acoustic waves is controlled to focus and steer them so as to combine at a desired location within the target media. Applications of the second embodiment of the invention include but are not limited to powering an engine or a pump, driving in fence posts/piles into the ground, use as a tamping device (e.g., to compact dirt), use as a forced entry device (like a battering ram), imaging a water body bottom, and use to crush/deform objects/stamp metal/etc.

Under a third exemplary embodiment of the invention, the overpressure wave generator of the present invention is used to generate a shear wave. Under one arrangement, an overpressure wave generator is oriented parallel to the target media and used to produce overpressure waves. Its recoil force is used to generate a plane shear wave. Under an alternative arrangement, two or more overpressure wave generators are oriented parallel to a target media and arranged such that they direct overpressure waves in opposite directions so that their recoil force can be used to generate a spherical shear wave.

The present invention provides a method for generating a conducted acoustic wave, comprising the steps of causing at least one detonation within at least one detonation tube having an open end to generate at least one overpressure wave and coupling a recoil force of the at least one overpressure wave to a target media to generate at least one said conducted acoustic wave. Under one arrangement, the open end of the at least one detonation tube is oriented to direct the overpressure waves perpendicular to and away from the target media. Under another arrangement, the open end of the at least one detonation tube is oriented to direct the overpressure waves parallel to the target media causing the recoil force to produce either a plane shear wave or a spherical shear wave depending on the how the at least one overpressure wave generator is arranged.

The target media can be any one of ground, ice, or water. The overpressure waves can be generated by controlling the detonation of a fuel-oxidant mixture flowing within each of said at least one detonation tube. The overpressure waves can be generated in accordance with a detonation parameter, which could be a timing code such as a Barker code. The sound of the at least one overpressure wave can be muffled.

The acoustic waves can also be directed to a location of interest within the target media by controlling the relative timing of the generation of the overpressure waves.

The present invention provides a system for generating a conducted acoustic wave, comprising at least one detonation tube having an open end for generating at least one overpressure wave and a coupling component for coupling a recoil force of said at least one overpressure wave to a target media to generate at least one said conducted acoustic wave. The system may further comprise a stabilizing mechanism that provides stability to the movement of the at least one detonation tube.

With one approach, the open end of the at least one detonation tube is oriented to direct the at least one overpressure wave perpendicular to and away from the target media where the stabilizing mechanism allows only up and down movement. Alternatively, the open end of the at least one detonation tube is oriented to direct the at least one overpressure wave parallel to the target media where the stabilizing mechanism allows only side to side movement.

Each of the overpressure waves is generated by controlling the detonation of a fuel-oxidant mixture flowing within each of said at least one detonation tube. The overpressure waves can be generated in accordance with detonation parameters, which could be a timing code such as a Barker code.

A muffler may be associated with at least one detonation tube.

The invention provides a system for generating and directing conducted acoustic waves, comprising a plurality of overpressure wave generators positioned in a sparse array, each of the plurality of overpressure wave generators comprising at least one detonation tube having an open end and being used to generate a plurality of overpressure waves, each of the plurality of overpressure waves having a recoil force; and a plurality of coupling components for coupling the recoil forces of said plurality of overpressure waves to a target media to generate said conducted acoustic waves, the conducted acoustic waves being directed to a location of interest within the target media based upon the relative timing of the generation of the plurality of overpressure waves.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 1A illustrates an exemplary prior art detonation tube having separate fuel and oxidizer supplies and a spark plug that ignites the fuel-oxidant mixture at the closed end of the tube after the tube has been filled;

FIG. 1B illustrates a second exemplary prior art detonation tube having a fuel-oxidant mixture supply and a spark plug that ignites the fuel-oxidant mixture at the closed end of the tube after the tube has been filled;

FIG. 2A illustrates an exemplary detonation tube of the present invention having a detonator that receives a fuel-oxidant mixture from a fuel-oxidant mixture supply and ignites the fuel-oxidant mixture as it is flowing into the tube;

FIG. 3A depicts an end view of another embodiment of the detonator of the present invention.

FIG. 3B depicts a side view of the detonator of FIG. 3A.

FIG. 8 depicts a side view of three detonation tubes having a first diameter connected to a larger detonation tube having a second larger diameter to amplify the combined pulse generated by the smaller tubes;

FIG. 9 provides an illustration of how the timing of the firing of individual detonation tubes focuses the power at a single point in the far field;

FIG. 10 depicts a sparse array of 4 detonation tubes being detonated so as to steer the overpressure waves such that they combine at a desired location;

FIG. 11 depicts a sparse array of 4 groups of detonation tubes being detonated so as to steer the overpressure waves such that they combine at a desired location;

FIG. 16 depicts a top down view of a scalable circular array pattern of seismic exploration systems of the present invention;

FIG. 17A depicts a side view of a plane shear wave generator in accordance with one embodiment of the present invention;

FIG. 17B depicts a plane shear wave;

FIG. 18A depicts a plan view of a spherical shear wave generator in accordance with one embodiment of the present invention;

FIG. 18B depicts a spherical shear wave; FIG. 18C depicts a plan view of a spherical shear wave generator in accordance with another embodiment of the present invention; and FIG. 18D depicts a plan view of a spherical shear wave generator in accordance with still another embodiment of the present invention.

DETAILED DESCRIPTION OF THE INVENTION

Figure 2B:
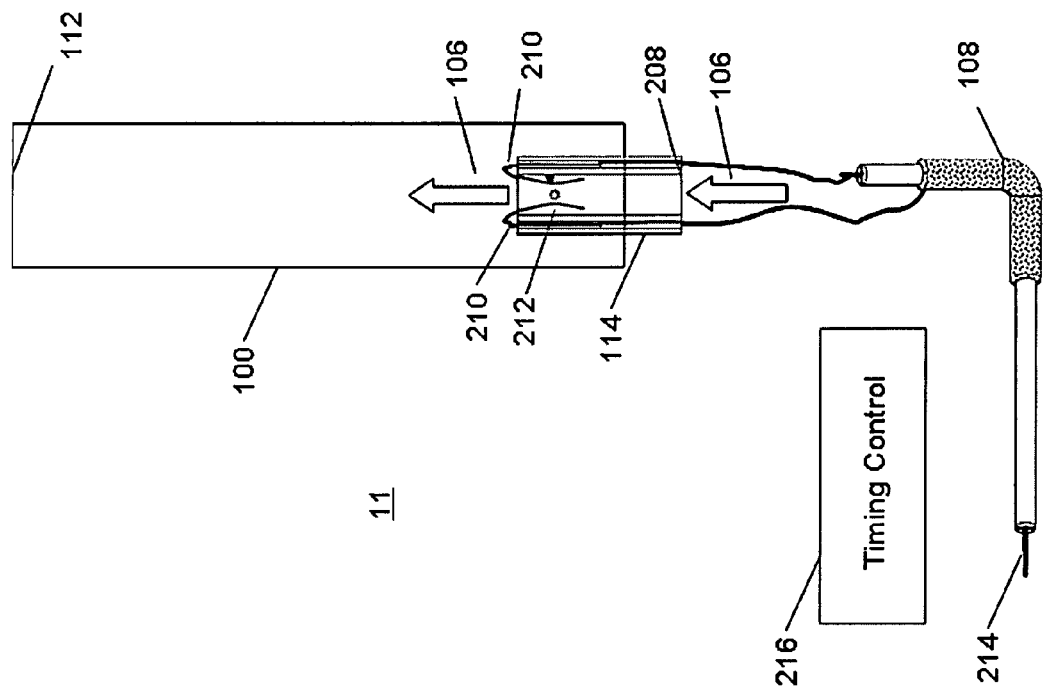
FIG. 2B depicts a first embodiment of the detonator of the present invention that functions by creating an electrical arc within a stream of a gas mixture

The present invention will now be described more fully in detail with reference to the accompanying drawings, in which the exemplary embodiments of the invention are shown. This invention should not, however, be construed as limited to the embodiments set forth herein; rather, they are provided so that this disclosure will be thorough and complete and will fully convey the scope of the invention to those skilled in the art. Like numbers refer to like elements throughout.

The present invention provides an improved system and method for generating and controlling an overpressure wave, which is also be referred to herein as a sound wave or sound pulse. Exemplary overpressure waves can be characterized by their frequency in the range of 0.1 Hz to 30 KHz. The basis of the system is the ignition of a high energy, detonable gaseous or dispersed fuel-air or fuel-oxygen mixture within a tube that is open at one end, where any of a number of flammable fuels can be used including ethane, methane, propane, hydrogen, butane, alcohol, acetylene, MAPP gas, gasoline, and aviation fuel. The gas mixture is detonated at the closed end of the tube causing a detonation wave to propagate the length of the tube where detonation ends and the detonation wave exits the open end of the tube as an overpressure wave. The tube is referred to herein as a detonation tube and the detonation wave is referred to herein as a detonation pulse or impulse.

One embodiment of the present invention comprises at least one detonation tube apparatus and a timing control mechanism for controlling the timing of detonations. The detonation tube apparatus comprises at least one detonation tube, at least one detonator, and a fuel-oxidant mixture supply subsystem. One or more detonators can be used with a given detonation tube and a detonator can be used with multiple detonation tubes. Associated with the one or more detonators is one or more spark initiators where a single spark initiator may initiate sparks in multiple detonators, which may be in parallel or in series, and multiple spark initiators may initiate sparks in a single detonator. The timing control mechanism controls the timing of the one or more spark initiators.

The spark initiator may be a high voltage pulse source. As an alternative to the high voltage pulse source a triggered spark gap approach can be used a spark initiator. Other alternatives for a spark initiator include a laser and an exploding wire.

The timing control mechanism can be a simple trigger mechanism, fixed logic, or be a more complex control processor. A control processor may also be used to control variable parameters of the fuel-oxidant mixture supply subsystem or such parameters may be fixed.

The fuel-oxidant mixture supply subsystem maintains a desired mass ratio of fuel versus oxidant of the fuel-oxidant mixture and a desired flow rate of the fuel-oxidant mixture. Desired fuel versus oxidant ratio and flow rate can be selected to achieve desired detonation characteristics that depend on length and diameter characteristics of the detonator. For example, one embodiment uses a propane-air fuel-oxidant mixture, a mass ratio of 5.5 and a flow rate of 50 liters/minute for a detonator having a length of 1" and a ¼" diameter and made of Teflon, a first detonation tube made of stainless steel having a length of 9" and a diameter that tapers from 0.8" at the end connected to the detonator to 0.65" at the end connected to a second detonation tube made of titanium having a length of 32" and a 3" diameter. Alternatively, the first detonation tube may have a constant diameter of 0.8".

Commercially available mass flow control valve technology can be used to control the mass ratio of fuel versus oxidant of the fuel-oxidant mixture and the flow rate of the fuel-oxidant mixture. Alternatively, commercially available technology can be used to measure the mass flow of oxidant into a fuel-oxidant mixture mixing apparatus and the precise oxidant mass flow measurement can be used to control a mass flow valve to regulate the mass flow of the fuel needed to achieve a desired mass ratio of fuel versus oxidant of the fuel-oxidant mixture.

Detonation within Flowing Fuel-Oxidant Mixture

Prior art gas detonation systems either required long tubes or highly detonable gas mixtures such as oxygen and hydrogen in order to produce a detonation. Otherwise they will only "deflagrate" which is a slow and nearly silent process. In contrast, one aspect of the present invention provides the ability to produce short, high intensity sound pulses within a tube as short as one foot long and 2 inches diameter, using only moderately explosive gas mixtures such as propane and air. Unlike the prior art systems, this aspect of the present invention is embodied in an exemplary system that passes an electric arc through a flowing (or moving) stream of gas and oxidizer mixture that is filling the tube within which the detonation will take place. When the tube is substantially full, a fast spark is initiated within the flowing gas at the filling point in the tube, which triggers the subsequent detonation of all the gas inside the tube. Alternatively, the flowing gas can be detonated by a laser or by any other suitable ignition and detonation method according to the present invention. This ignition within flowing gas technique dramatically shortens the tube length required to produce a detonation when compared to prior art systems that ignited non-flowing or otherwise still gas mixtures. Moreover, detonation according to this aspect of the present invention requires on the order of 1 Joule of energy to detonate the fuel-oxidant mixture whereas prior art systems may require 100's to 1000's of Joules of energy to achieve detonation. Further desirable results of this method are the reduction of uncertainty of time between the electric arc trigger and the subsequent emission of the sound pulse from the tube and the repeatability of detonation pulse magnitude. As such, the detonator according to this aspect of the present invention enables precise timing and magnitude control of an overpressure wave.

FIG. 1A depicts a side view of a prior art detonation system. A detonation tube 100 has separate fuel supply 102 and oxidizer supply 104 which are opened during a fill period to fill detonation tube 100 with fuel-oxidant mixture 106. After the fill period, fuel supply 102 and oxidizer supply 104 are closed and at a desired time a charge is applied through high voltage wire 108 to spark plug 110, which ignites the fuel-oxidant mixture 106 causing a detonation wave to propagate down the length of the detonation tube 100 and exit its open end 112. Similarly, FIG. 1B depicts a side view of another prior art detonation system where detonation tube 100 has a fuel-oxidant mixture supply 105 which is opened during a fill period to fill detonation tube 100 with fuel-oxidant mixture 106. After the fill period, fuel-oxidant mixture supply 105 is closed and at a desired time a charge is applied through high voltage wire 108 to spark plug 110, which ignites the fuel-oxidant mixture 106 causing a detonation wave to propagate down the length of the detonation tube 100 and exit its open end 112.

FIG. 2A depicts the detonation tube 100 of the overpressure wave generator 11 of the present invention being supplied by fuel-oxidant mixture supply 105 via detonator 114, where a spark ignites within the fuel-oxidant mixture 106 while the detonation tube 100 is being filed with the fuel-oxidant mixture 106 causing a detonation wave to propagate down the length of the detonation tube 100 and exit its open end 112. In one embodiment, an appropriate fuel-oxidant mixture flow rate is maintained during ignition within the flowing fuel-oxidant mixture. It has been found that over a substantial range of flows the higher the flow rate the more rapid the evolution of the detonation wave. Hence, one exemplary embodiment uses a high flow rate. For a given spark energy, a certain flow rate defines the practical upper limit of flow rate. In one embodiment, the tubing that feeds the detonation tube is below a critical radius to prevent the detonation progressing back to the fuel supply. For example, one embodiment use ¼" diameter tubing to prevent such flashback and yet presents a low resistance to gas flow. For example, a 1" long detonator having a ¼" diameter bore hole can achieve detonation using a 1 joule spark within a MAPP gas-air mixture flowing at 50 liters/minute.

Also shown in FIG. 2A is an optional secondary fuel-oxidant mixture supply 105'. One or more secondary fuel-oxidant mixture supplies 105' can be used to speed up the filling of a large detonation tube (or tube combination). With one approach, one or more secondary fuel-oxidant mixture supplies 105' are used to speed up filling of a detonation tube 100 in parallel with the (primary) fuel-oxidant mixture supply 105 such that detonator 114 can ignite the flowing fuel-oxidant mixture at a desired flow rate. With another approach, fuel-oxidant mixture supply 105 may supply the detonation tube at a first higher rate and then change to a second rate prior to the flowing fuel-oxidant mixture being ignited. In still another approach, secondary fuel-oxidant mixture supply 105' supplies a different fuel-oxidant mixture 106' (not shown in FIG. 2A) into detonation tube 100 than the fuel-oxidant mixture 106 supplied by fuel-oxidant mixture supply 105 into detonator 114.

For certain fuels it may be necessary to heat the fuel-oxidant mixture in order to achieve detonation. Depending on the rate at which the detonation tube is fired, it may be necessary to cool the detonation tube. Under one preferred embodiment of the invention, fuel supply 105 (and/or 105') comprises at least one heat exchange apparatus (not shown) in contact with the detonation tube that serves to transfer heat from the detonation tube to the fuel-oxidant mixture. A heat exchange apparatus can take any of various well known forms such as small tubing that spirals around the detonation tube from one end to the other where the tightness of the spiral may be constant or may vary over the length of the detonation tube. Another exemplary heat exchanger approach is for the detonation tube to be encompassed by a containment vessel such that fuel-oxidant mixture within the containment vessel that is in contact with the detonation tube absorbs heat from the detonation tube. Alternatively, a heat exchanger apparatus may be used that is independent of fuel supply 105 in which case some substance other than the fuel-oxidant mixture, for example a liquid such as water or silicon, can be used to absorb heat from the detonation tube. Alternatively, another source of heat may be used to heat the fuel-oxidant mixture. Generally, various well known techniques can be used to cool the detonation tube and/or to heat the fuel-oxidant mixture including methods that transfer heat from the detonation tube to the fuel-oxidant mixture.

FIG. 2B depicts a first embodiment of the detonator of the present invention that functions by creating an electrical arc within a stream of a detonatable gas mixture. As shown in FIG. 2B, a gas mixture 106 of a combustible gas and oxidizer in the correct detonable ratio is passed into a detonation tube 100 via fill point 208 of detonator 114. When the tube is substantially full, high voltage wire 108 is triggered at high voltage trigger input 214 to cause a spark 212 to occur across bare wires 210 and to pass through the gas mixture 106 flowing into the detonation tube 100 to initiate detonation of the gas in the detonation tube 100. Triggering of high voltage trigger is controlled by timing control mechanism 216.

Figure 2C:
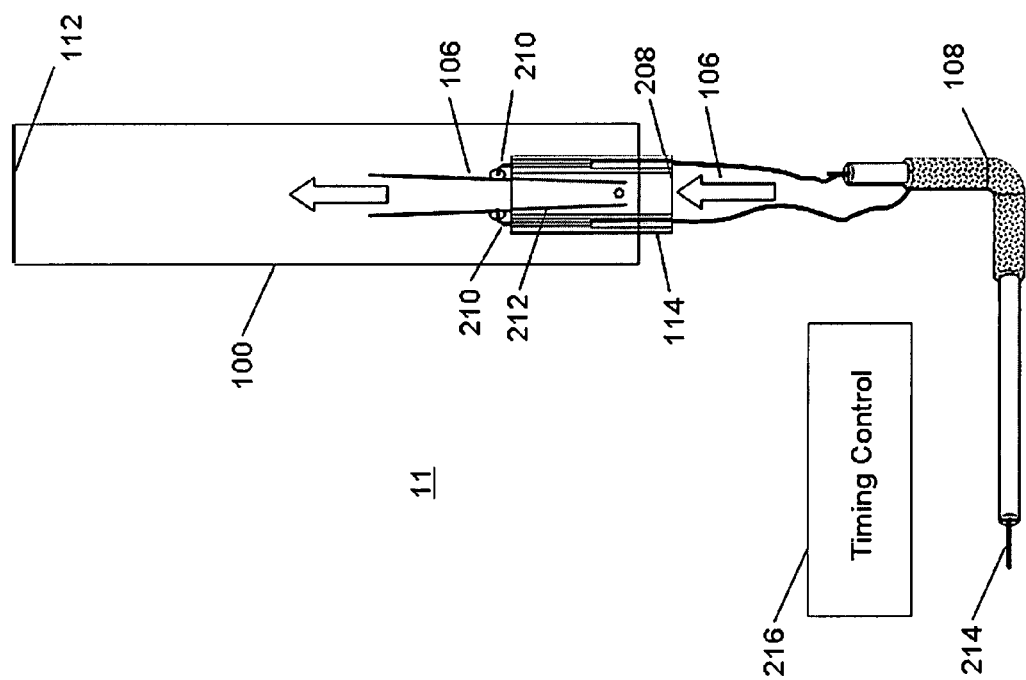
FIG. 2C depicts a second embodiment of the detonator of the present invention is similar to that depicted in FIG. 2B except it includes two conductors that diverge into the main tube causing the length of the spark to increase as it travels into the main detonation tube.

FIG. 2C depicts a second embodiment of the detonator of the present invention that also functions by creating an electrical arc within a stream of a detonatable gas mixture. As shown in FIG. 2C, a gas mixture 106 of a combustible gas and oxidizer in the correct detonable ratio is passed into a detonation tube 100 via fill point 208 of detonator 114. When the tube is substantially full, high voltage wire 108 is triggered at high voltage trigger input 214 to cause a spark 212 to occur across bare wires 210 and to pass through the gas mixture 106 flowing into the detonation tube 100 to initiate detonation of the gas in the detonation tube 100. In this variation the spark is initiated within detonator 114 and then it is quickly swept along the two diverging conductors into the detonation tube 100 by the flowing gas, the length of the spark increasing as it travels into the detonation tube 100. When a spark is initiated in a small gap it creates a stable low impedance zone that is capable of conducting the same voltage electricity across a much larger gap. Alternatively, the wires 210 may be parallel but bent slightly closer together to ensure that the spark starts inside detonator 114. FIGS. 3A and 3B provide end and side views of an exemplary embodiment of the overpressure wave generator 11 of the present invention. As shown in FIGS. 3A and 3B, detonator 114 comprises insulating cylinder 302 surrounding detonator tube 304. Electrodes 306 are inserted from the sides of insulating cylinder 302 and are connected to high voltage wire 108. The detonator tube 304 is connected to fuel-oxidant mixture supply 105 (shown in FIG. 3B) at fill point 208 and to detonation tube 100 at its opposite end. As shown in FIG. 3B, a gas mixture 106 is passed into the detonation tube 304 and then into detonation tube 100 via fill point 208 of detonator 114. When detonation tube 100 is essentially full, high voltage wire 108 is triggered to cause a spark 212 to occur across electrodes 306 and to pass through the gas mixture 106 flowing into detonator tube 304 to initiate detonation of the gas in detonation tube 100. Also shown in FIG. 3B is a Shchelkin spiral 308 just inside the closed end of detonation tube 100. The Shchelkin spiral 308 is well known in the art as a deflagration-to-detonation transition (DDT) enhancement device. In one exemplary embodiment of the invention the Shchelkin spiral 308 has 10 turns, is 7" long, and is constructed using #4 copper wire that is tightly wound against the inside of the detonation tube 100 at its base (closed end).

Overpressure Wave Magnitude Control

Figure 4:
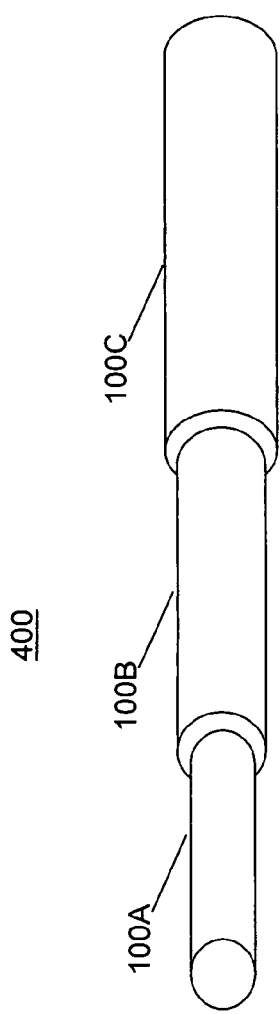
FIG. 4 depicts an exemplary graduating detonation tube combination whereby larger and larger diameter tubes are used in combination to amplify a detonation wave.
Figure 5:
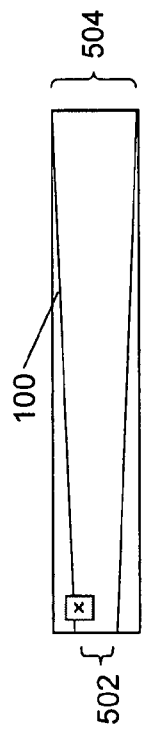
FIG. 5 depicts an exemplary detonation tube having a diameter that increases across the length of the tube that amplifies a detonation wave.
Figure 6:
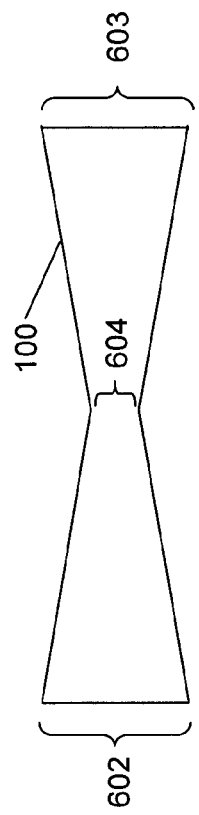
FIG. 6 illustrates a tube having a gradually shrinking and then gradually enlarging tube circumference.

Generally, the length and inside diameter of a detonation tube can be selected to achieve a desired maximum generated overpressure wave magnitude at a maximum selected flow rate of a selected flowing fuel-oxidant mixture, and the flow rate can be reduced to lower the magnitude of the generated overpressure wave. If required, increasingly larger tubes can be used to amplify the detonation pulse initially produced in a smaller detonation tube. Each one or a plurality of the tubes can be made of one or a combination of materials and allows, including PVC or a variety of different compounds, metals, or even concrete to achieve a desired result. In one exemplary embodiment the detonation tube is made of titanium. In an exemplary embodiment, the detonator within which the spark is introduced has a small diameter, e.g. approximately ¼" diameter. This assembly is aligned to the base of a second larger detonation tube so that the gas contained within it is detonated. This second detonation tube may then be aligned to the base of a successively larger diameter tube to initiate detonation of the gas mixture within. In this way, very large diameter detonation tube detonations may be initiated with precise timing accuracy. The use of tubes having increasingly larger diameters is shown in FIG. 4 which illustrates a graduating detonation tube combination 400 comprising increasingly larger detonation tubes that amplify a detonation pulse. A detonation pulse produced in an initial detonation tube 100A travels through detonation tubes 100B and 100C having larger diameters. Generally, as the detonation of the gas mixture transitions from a detonation tube having a smaller diameter to a detonation tube having a larger diameter the size of the pulse is amplified. In accordance with the invention one or more detonation tubes having different diameters can be combined into a graduating detonation tube combination 400. In the exemplary embodiment described above, the detonation tube (and the detonator tube) was assumed to be a tube having a circumference that does not vary over the length of the tube. As an alternative, a detonation tube (or detonator tube) may begin with a small diameter and gradually grow larger in order to have a similar effect of amplifying the pulse as described for FIG. 4. One exemplary approach is shown in FIG. 5 which depicts a side view of a detonation tube 100 having a gradually enlarging diameter. The diameter of a detonation tube becoming larger and larger causes the pulse to be amplified as it travels the length of the tube in a manner similar to the graduated tube technique of FIG. 4. As shown, detonation tube 100 has a first diameter 502 at one end that is smaller than second diameter 504 at the other end. Multiple tubes having enlarging diameters can also be combined. Another variation of the detonation tube is to use a compressor/expander technique where the circumference of the tube tapers to a smaller circumference to compress the gas and then expands to a larger circumference to expand the gas. This approach is shown in FIG. 6 which depicts a side view of detonation tube 100 based on the compressor/expander technique that has a first diameter 602 at one end, a second diameter 603 at the other end and a third diameter 604 between the two ends of the detonation tube 100. The first diameter 602 may or may not equal second diameter 603 depending on desired compression/expansion characteristics.

Detonation Tube Arrays

Figure 7A:
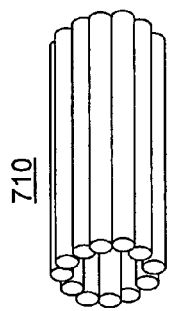
FIG. 7A depicts a first detonation tube alongside a second detonation tube.
Figure 7B:
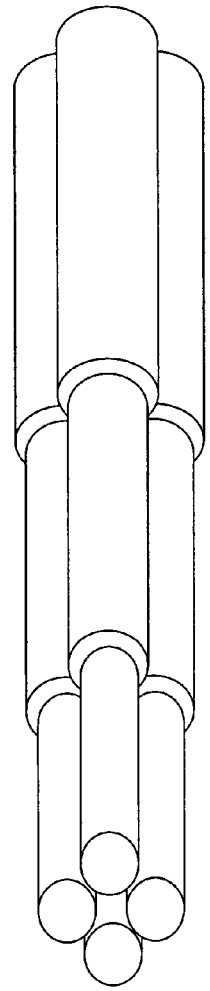
FIG. 7B depicts four detonation tube combinations arranged such that the larger detonations tubes of the detonation tube combinations are in contact with each other.
Figure 7C:
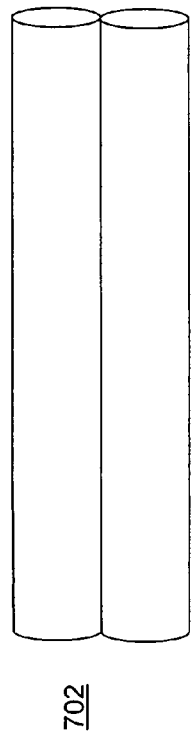
FIG. 7C depicts three enlarging diameter detonation tubes.
Figure 7D:
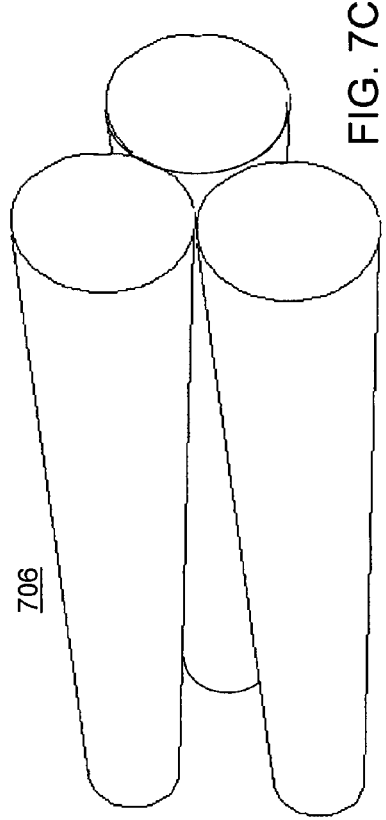
FIG. 7D depicts seven detonation tubes arranged to resemble a hexagonal structure.
Figure 7E:
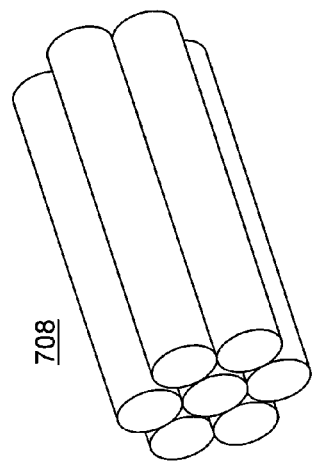
FIG. 7E depicts twelve detonation tubes arranged in a circular manner.

Detonation tubes can be grouped into arrays in various ways to produce a combined pulse when triggered simultaneously. FIGS. 7A-7D depict examples of how detonation tubes can be combined. FIG. 7A depicts a detonation tube array 702 comprising a first detonation tube alongside a second detonation tube. FIG. 7B depicts a detonation tube array 704 comprising four detonation tube combinations arranged such that the larger detonations tubes of the detonation tube combinations are in contact with each other. FIG. 7C depicts detonation tube array 706 comprising three enlarging diameter detonation tubes. FIG. 7D depicts detonation tube array 708 comprising seven detonation tubes arranged to resemble a hexagonal structure. FIG. 7E depicts detonation tube array 710 comprising twelve detonation tubes arranged in a circular manner.

Alternatively, the detonation tubes that make up such detonation tube groups or arrays can also be triggered at different times. Under one arrangement, detonation tubes are ignited using a timing sequence that causes them to detonate in succession such that a given detonation tube is being filled with its fuel-oxidant mixture while other detonation tubes are in various states of generating an overpressure wave. With this approach, the igniting and filling of the detonation tubes could be timed such that overpressure waves are being generated by the apparatus at such a high rate that it would appear to be continuous detonation.

As shown in FIG. 8, a group of smaller tubes can be connected to a larger tube such that their combined pulses produce a large pulse that continues to detonate in the larger tube. FIG. 8 depicts a side view of 3 smaller detonation tubes 100A having a first diameter connected to a larger detonation tube 1008 having a second larger diameter to amplify a combined pulse.

Generally, any of various possible combinations of graduated tubes, tubes of gradually increasing circumferences, tube arrays, groups of smaller tubes connected to larger tubes, and tubes employing the compressor/expander technique can be used in accordance with this aspect of the invention to generate overpressure waves that meet specific application requirements. All such combinations require balancing the energy potential created due to an expansion of a pipe circumference with the cooling caused by expansion of the gases as the tube circumference increases.

Coherent Focusing and Steering of Overpressure Waves

As described previously, the detonator of this aspect of the present invention has low uncertainty of time between the electric arc trigger and the subsequent emission of the sound pulse from the tube. The detonator also provides for repeatable precision control of the magnitude of the generated sound pulses. This low uncertainty, or jitter, and precision magnitude control enables the coherent focusing and steering of the overpressure waves generated by an array of detonation tubes. As such, the detonator can be used to generate steerable, focusable, high peak pulse power overpressure waves.

FIG. 9 illustrates how the timing of the firing of individual tubes focuses the power of the generated overpressure waves at a single point in the far field. Tubes further away are triggered earlier to compensate for the greater amount of time required to travel a greater distance which causes all the pulses to arrive at the same point in space at the same time. FIG. 9 depicts an array 900 of detonation tubes 100A-100E that are ignited (or fired) with controlled timing as controlled by timing control mechanism 216 such that the sound pulses they generate arrive at point in space 902 at the same time. The sound pulses 906 produced by detonation tubes 100A-100E travel along direct paths 904A-904E, respectively. As such, they are fired in sequence 100E-100A with appropriate delays between firings to account for different times of travel required to travel the different direct paths so that the sound pulses 906 arrive at point in space 902 at the same time to produce combined sound pulse 908.

Individual detonation tubes or groups of tubes can be arranged in a sparse array. FIG. 10 depicts an array of individual detonation tubes arranged in a sparse array where the timing of the detonations in the various tubes is controlled so as to steer the overpressure waves such that they combine at a desired location. FIG. 11 similarly depicts an array of groups of tubes arranged in a sparse array where the tubes of a given group are detonated at the same time but the detonation timing of the various groups is varied so as to steer the overpressure waves so they combine at a desired location.

Referring to FIG. 10, detonation tubes 100A-100D are fired in reverse sequence with precise timing as controlled by timing control mechanism 216 such that sound pulses travel direct paths 904A-904D and combine at point in space 902. Referring to FIG. 11, detonation tube groups 1100A-1100D are fired in reverse sequence as controlled by timing control mechanism 216 such that sound pulses travel direct paths 904A-904D and combine at point in space 902.

The timing control mechanism 216 used in sparse array embodiments may comprise a single timing control mechanism in communication with each of the overpressure wave generators making up the array via a wired or wireless network. Alternatively, each of the overpressure wave generators may have its own timing control mechanism whereby the timing control mechanisms have been synchronized by some means.

Theory of Operation of Detonation Tube Arrays

Generally, when an array of detonation tubes is triggered with precise timing a pressure wave is created that propagates as a narrow beam in a direction mandated by the timing. In this way its operation is analogous to a phased array antenna commonly used in radar systems. Since the timing is determined electrically the beam direction can be redirected from one pulse to the next. Systems can be designed that operate at different rates, for example 10, 20, 50 or 100 pulses per second, and each pulse can be aimed in a unique direction. The only limitation to repetition rate is the speed with which the tubes can be refilled. At a sonic refill rate it would take about five milliseconds to refill a tube five feet long. Since it also takes a pulse five milliseconds to exit once detonated, the limiting repetition rate is 100 Hz.

Since each element of the array emits its own coherent energy, in the far field the amplitude of the wave approaches the square of the intensity of each individual tube. The instantaneous over pressures that can be directed in this way therefore may approach high levels. As such, the system possesses a large overhead dynamic range that can be used to reach a long range or propagate through small apertures in structures such as hard targets.

The structure behind the small aperture can be resonated by application of the pulses at just the right time intervals, as determined by a probe laser used to measure the Doppler shift of particles at the opening. The natural frequency of the structure can thereby be determined and thereafter the laser is used in closed loop mode to control the timing of the system to produce maximum effect. The instantaneous pressures inside such a hard target can be quite large since the acoustic Q is high. For example, for a Q of only 10 the peak pressure could approach 1000 psi.

Figure 12:
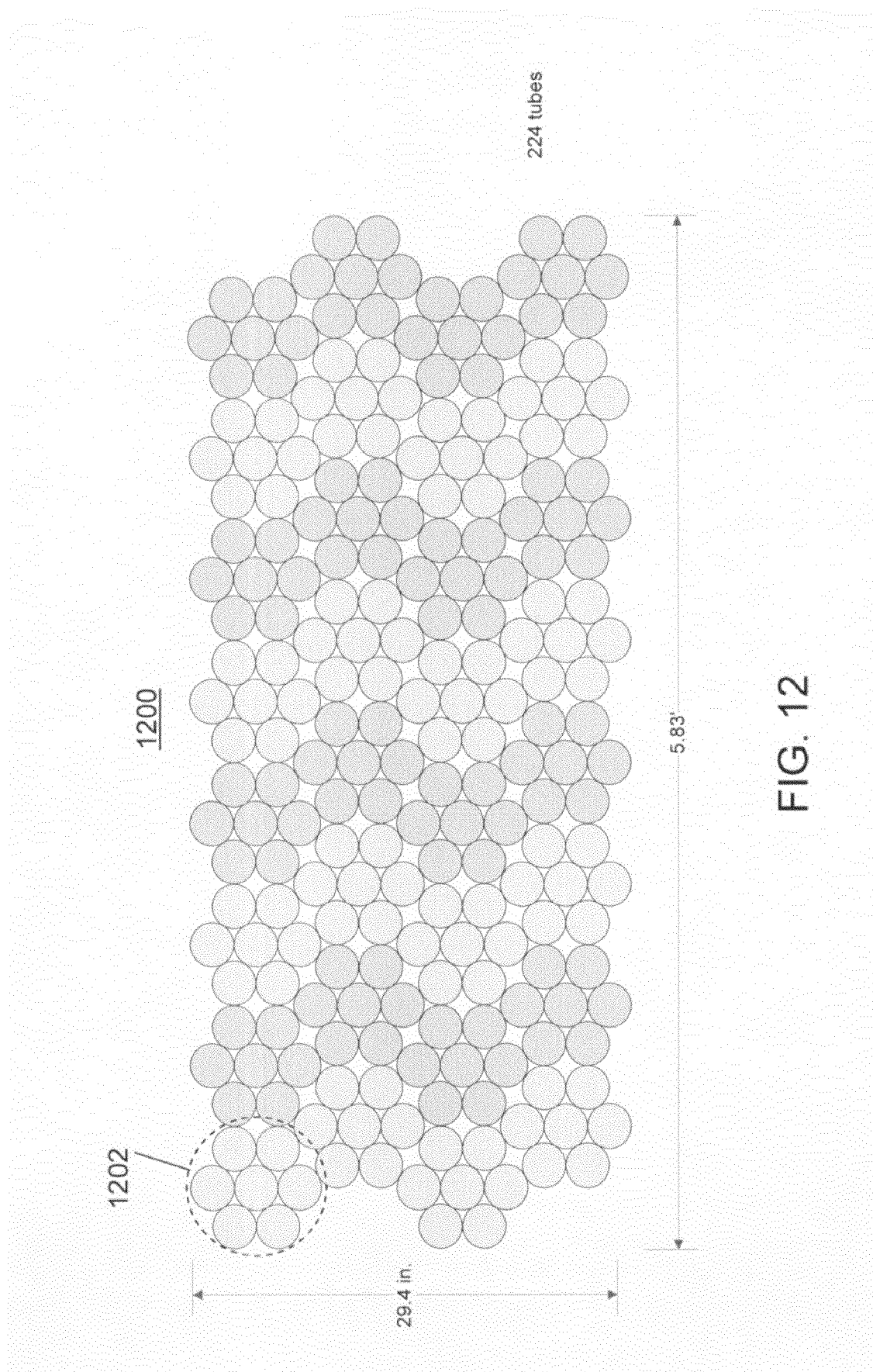
FIG. 12 illustrates an example of efficient packing of hexagonal sub-arrays of 7 detonation tubes into a combined array totaling 224 detonation tubes.

Groups of detonation tubes can be treated as sub-arrays within a larger array. FIG. 12 illustrates an exemplary embodiment of 32 hexagonal sub-arrays 1202 of 7 detonation tubes each efficiently packed into an array 1200 having a total of 224 3" diameter detonation tubes in a 6.2'×2.5' format. The far field intensity of this system can be over 50,000 times the intensity of one such 3" detonation tube.

Timing of the firing of the array elements of this embodiment is straightforward. The waveform is about one millisecond long and the constraint for coherence is ¼ of its wavelength or less. The timing subsystem therefore will need a resolution and accuracy of 200 microseconds or less. This level of timing accuracy can be accomplished with programmable counter-timers such as Intel's 8254 PCA that provides three channels of timing per chip, at a resolution of 0.1 microsecond.

In one embodiment, each element in a steerable array needs to have its energy spread over the entire area of steerability, for example, with an aperture that has under ½ wavelength. For a one millisecond waveform the aperture is about six inches. In the exemplary embodiment shown in FIG. 12, the hexagonal sub-array bundles are nine inches across so they will not allow steering over a full half hemisphere but grouping the tubes into the hexagonal bundles that are fired as a group reduces the hardware requirements allowing thirty two programmable timing channels are used to focus and steer the array. As such, all timing needs can be met with only eleven 8254's. A PCI board made by SuperLogics contains four 8254's giving twelve programmable counter-timers so three modules would suffice. In another embodiment, the tubes of each buddle in FIG. 12 could be spaced apart sufficiently to enable steering over a full half hemisphere and the firing of all the tubes could be independent, without grouping.

The focal spot of the array is a function of the wavelength and the size of the array. Near the array face the focal spot comprises an approximate circle one wavelength, i.e. one foot in diameter. At greater distances the spot will gradually spread out in an oval shape with its large diameter in the direction of the small diameter of the array. That is, the oval becomes vertical for the horizontal array depicted in FIG. 12. The shape of the focal spot can be easily modeled using the wave equation when it is operated in the linear regime up to about half an atmosphere or 7 psi. However when the instantaneous pressure in the waveform approaches an atmosphere it will be non-linear and the calculation differs.

Measurements of the pressure output of the array can be made with a wide band acoustic sensor. They typically have a bandwidth of 10-20,000 Hz and an accuracy of 1 dB or so. Measurements made at a distance of thirty feet or more in the far field of the array give accuracies sufficient to extrapolate characteristics at any range. The calibrated output of such an instrument is acoustic sound pressure level which has a direct relationship to pressure, i.e.

$$L_p(dBSPL) = 10 \cdot \log_{10} \frac{p}{p_0}.$$

For example, 180 dBSPL is equivalent to a pressure of 20,000 Pa or about 3 psi. The instantaneous sound intensity associated with this level is 1,000,000 W/m².

A consequence of the general wave equation for linear media is that when waves superimpose their amplitudes add. For electromagnetic waves this means that if two identical waves arrive at a point in space at the same time and phase they will produce double the potential, or voltage of a single wave.

The result is similar in the case of acoustic waves but in this case the potential is pressure rather than voltage.

$$p = \sqrt{p_1^2 + p_2^2 + 2p_1 p_2 \cos(\theta_1 - \theta_2)} N/m^2$$

Note that since the phases are equal the cosine is equal to 1 and the value of the pressure is equal to twice the pressure of a single source. This relation applies for the addition of N sources=N*p.

Doubling the pressure of an acoustic waveform quadruples its power since power is proportional to the square of its pressure, namely, when two identical acoustic waveforms arrive at the same point in space at the same time and phase their power will quadruple.

In analogy to electromagnetic waves the power, or acoustic intensity, of a waveform is proportional to the square of its pressure.

$$I = \frac{p^2}{\rho c} \text{ Watts/m}^2$$

Where the denominator is the value of the acoustic impedance of the medium, in this case air.

Therefore, generally the free-space, far-field power in the main lobe of the overpressure waveform can be calculated as $N^2$ of the pressure of a single detonation tube. However, when it is operated near the ground, advantage can also be taken of the additive effect of the ground wave. When the wave from the ground and the free-space waveforms converge on a target the pressures of both waveforms again add and quadruple the power again.

Beam steering is accomplished by adjusting the timing of the individual elements such that the closer ones are delayed just enough for the waves from the further part of the array to catch up. In a given steering direction therefore all of the waves will arrive at the same time and satisfy the $N^2$ power criterion. This is analogous to a phased array antenna but since the acoustic waveform is transient rather than continuous wave, time delay is substituted for phase.

Applications of the Overpressure Wave Generator of the Present Invention

Applications of the overpressure wave generator of the present invention include but are not limited to explosives emulation for training purposes, explosives barrier testing, demolition of mines/buildings, crowd control, border defense, animal/bird/insect control, prisoner control, structural strength/integrity testing, providing rotary motion to a windmill or a turbine, use as a thrust source for rocket-like propulsion, dirt/sand/snow/ice removal for roads/runways/airplanes/etc, fruit/vegetable/grain/etc. harvesting from trees/bushes/plants and comparable agriculture applications, industrial cleaning (e.g., smoke stacks/precipitators), object forming (e.g., a compliant press/molding process), fire suppression, and, in general, most any area denial/security application.

Using the Recoil Force of an Overpressure Wave for Seismic Exploration

Figure 13:
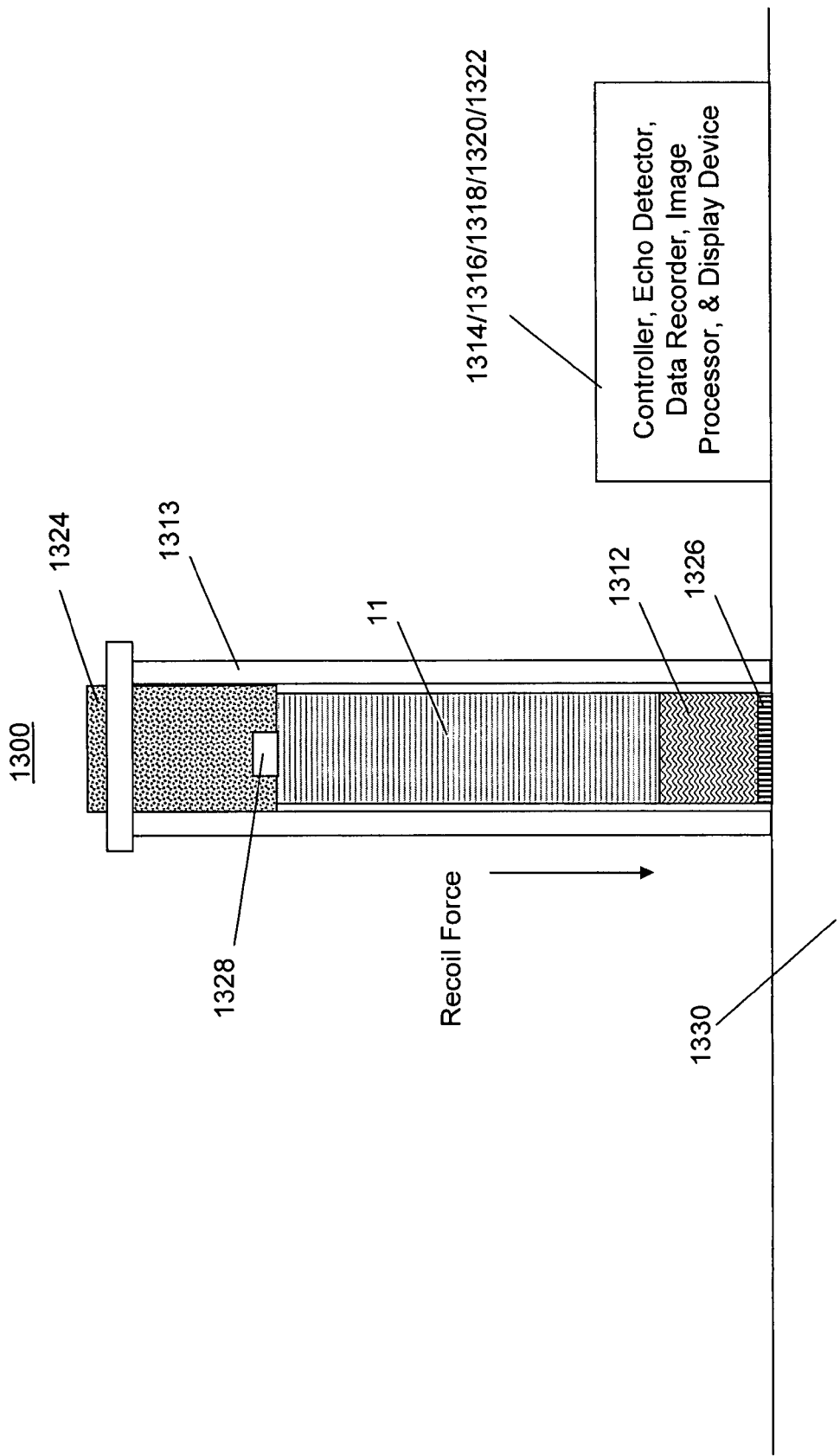
FIG. 13 depicts a system that harnesses the recoil force of the overpressure wave generator of the present invention for seismic exploration.

The overpressure wave generator of the present invention described above can be augmented so as to harness its recoil force for seismic exploration purposes. Recoil force is the backward kick or force produced by the detonation of overpressure waves. This force is equal to the derivative of the backward momentum resulting from detonation of overpressure waves. In one embodiment of the seismic exploration system in accordance with the present invention, as shown in FIG. 13, seismic exploration system 1300 includes an overpressure wave generator 11, a coupling component 1312, a stabilizing mechanism 1313 for controlling the movement of the overpressure wave generator, a controller 1314 for controlling the operation of the overpressure wave generator 11, an echo detector 1316, a data recorder 1318, an image processor 1320, and a display device 1322. It should be understood that while the foregoing elements of the system 1300 are identified separately, these elements do not necessarily have to be physically separated. Some elements can be configured to reside on the same machine, for example, the controller 1314, the data recorder 1318, and the image processor 1320 can all be parts of a single computer. The system 1300 may optionally include a muffling apparatus 1324 which includes vent 1328 used to provide dilution gas (e.g., air) used to prevent detonation from continuing into the muffling apparatus 1324. Alternatively, the seismic exploration system can be operated without using coupling component 1312, in which case overpressure wave generator 11 will be directly in contact with the ground 1330.

Exemplary overpressure wave generator 11 of system 1300 may include any of the variations described above. It includes an electrical (or laser) source for producing a spark, a detonation tube, a gas mixture source that provides the flowing gas into the detonation tube, and a detonator. For the purposes of the description below, the overpressure wave generator can alternatively be a group of detonation tubes that are detonated simultaneously so as to produce a combined overpressure wave.

The overpressure wave generator is detonated to generate an overpressure wave, which is optionally muffled by muffler 1324. The generation of the overpressure wave causes a corresponding recoil force which coupling component 1312 couples to a target media such as the ground, ice, or water to produce a conducted acoustic wave. Stabilizing mechanism 1313 provides stability to the movement of the overpressure wave generator 11 essentially allowing only up and down movement. Coupling component 1312 may comprise a spring or may comprise rubber or some comparable compound having desired spring-like and damping characteristics, such as opposing polarity magnets. Coupling component also comprises impedance transition device 1326 having a desired shape which directly contacts the ground 1330 to impart the conducted acoustic wave. Impedance transition device 1326 can have any of various types of shapes including having a single sharp point, multiple sharp points, a flat plate-like shape that may be square, rectangular, circular, or any other desired shape. In an exemplary embodiment, the impedance transition device 1326 has a flat round shape. If the target media is water, the coupling component may comprise a diaphragm that is in contact with the water. If the target media is solid such as the ground or ice, the overpressure wave generator may alternatively be placed directly in contact with the target media such that its recoil force will be directly coupled to the target media.

Under one embodiment of the present invention, multiple conducted acoustic waves are delivered to the ground in a sequence timed in accordance with a timing code that has desirable correlation properties. Coding of the pulses permits pulses to be emitted at a higher rate than could be accomplished by waiting for all echoes to subside before new pulses are generated. Such coding thereby increases the power of the emitted signal and reduces the time needed to acquire an image of a given signal-to-noise ratio. For example, a Barker code has desirable autocorrelation properties. Any of various coding techniques that provide desirable correlation properties that are well known in the art of radar and communications can be used.

As previously mentioned, the overpressure wave is generated by the controlled and directed explosion of a detonable gaseous or dispersed fuel-air or fuel-oxygen mixture. Any of a number of flammable fuels can be used including ethane, methane, propane, hydrogen, butane, alcohol, acetylene, MAPP gas, gasoline, and aviation fuel. The use of such flammable fuels have significant advantages over solid and/or liquid explosives, since they are easily obtainable from various sources and are relatively low in cost. The overpressure wave is generated in accordance with detonation parameters such as the mass ratio of the fuel-oxidant mixture, a timing code, etc.

Furthermore, the explosion of a flammable fuel produces more accurate results. Maximum energy is imparted to the ground per unit of time resulting in a clearer picture. The improved clarity is attributed to the reduction of non-linearity effects. Non-linearity effects are substantially reduced because the coupling component 1312 does not compress the earth thereby producing mostly linear signals. In addition, a series of smaller explosions can be set off over a period of time, and the resulting received signals can be integrated to obtain any desired degree of resolution and any desired depth can be reached by extending the detection period.

The controller 1314 is used to control the operation of the overpressure wave generator 11. The controller 1314 can be a portable computer or workstation which is programmed to generate the desired time-coded timing sequence upon which the overpressure wave generator 11 is triggered.

The echo detector 1316 can be made up of an array of sensors or geophones. This array of geophones constitutes a synthetic aperture array which is analogous to synthetic aperture array radar. This synthetic aperture array allows for the capture of highly focused, clear image data from the subsurface in multiple focal lengths and in real time without moving or modifying the array configuration. This allows data taken from an array of non-directional sensors to be focused at any point in the ground via post-processing. Such processing is the geophysical analogy to synthetic aperture array processing, meaning that the data from the individual geophones can be combined coherently to be the equivalent of a much larger focusable geophone. Using this synthetic aperture array, data collection is done with fewer geophones than both explosives and vibration couplers. Furthermore, the array of geophones can be distributed randomly and are not required to be arranged in a conventional grid array.

The data or echoes captured by the echo detector 1316 are stored in the data recorder 1318 for subsequent processing. Various types of storage devices commonly known in the art can be used as the data recorder 1318. Similarly, conventional devices commonly known in the art can be used as the image processor 1320 and the display device 1322.

Figure 14:
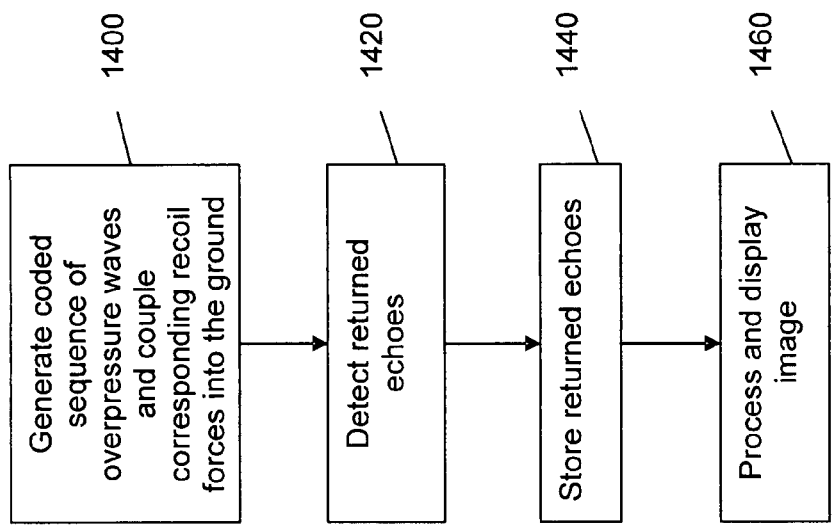
FIG. 14 depicts the logical flow diagram for seismic exploration process.

FIG. 14 illustrates the logical steps taken during the operation of the system 1300 in accordance with the present invention. At step 1400, overpressure wave generator 11 and coupling component 1312 direct a sequence of time coded conducted acoustic waves into the subsurface where they are reflected and scattered by subsurface variations in physical properties.

At step 1420, the echoes or waves returning to the surface are detected by the echo detector 1316, i.e., the geophones. The geophones record the time histories of ground motion over a few seconds. The amplitudes, frequencies, and phases of these trace recordings are affected by various physical properties of the subsurface such as elastic constants, geometry, dimensions, inelasticity and anisotropy.

At step 1440, the data recorder 1318 stores the response of the earth as detected by the geophones. The data recorder 1318 communicates with the geophones via an analog-to-digital converter and a multiplexer, and records and stores the data in one of several optional storage devices for subsequent processing and display.

At step 1460, the recorded data can be processed by the image processor 1320 in accordance with various well-known imaging algorithms and the results can then be displayed through the display device 1322.

The conventional presentation of seismic data is to plot a series of return amplitude vs. time waveforms on the vertical axis (a waveform plot). The "wiggles" are reflections due to inhomogenities of physical properties. The layout of the geophone array and the subsequent data processing to form an image from a synthetic aperture array is analogous to a synthetic aperture radar array. In analogy to optical lens systems, a fixed focal length antenna array would not remain in focus through the whole depth of field required if the system must image from near the surface to hundreds of feet below the surface. Thus, the antenna would need to be both large to cover a reasonable area of ground and also focusable in real time.

Since off axis reflections are received at successively greater delays at the antenna, they create a "point scatterer" which traces a curve in the resulting image. This curve is calculable, and can be removed in post processing. This allows data taken from an array of non-directional antennas to be focused at any point in the ground via post processing. Such synthetic aperture array processing enables the data from the individual antennas to be combined coherently so as to be the equivalent of a much larger focusable antenna.

The primary data wavefront curves are generated virtually in real time and can be interpreted by an experienced geophysicist. Spatial locations and 3-D imagery can be generated by using standard tomographic image processing. Higher resolution subsurface discrimination can be achieved through the combination of successive wavefront curves over time.

The system 1300 has the capability to provide a quick look at the data in the field in real time. This capability can be useful to guide the direction of subsurface imaging efforts based on what is found in the field and ensure that the data taken to be analyzed are of sufficient fidelity and signal-to-noise ratio for maximum utility.

Figure 15:
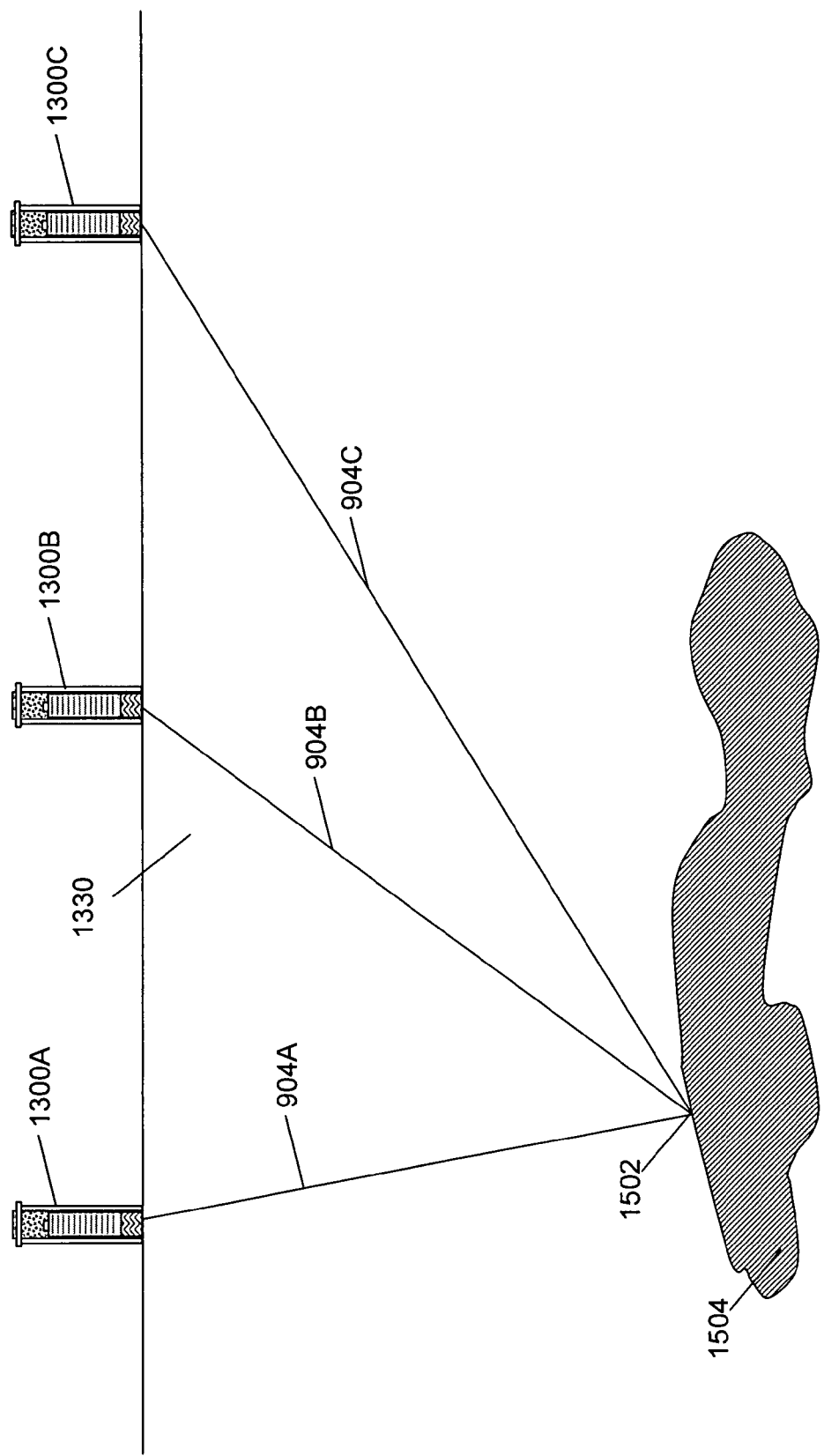
FIG. 15 depicts an array of seismic exploration systems of the present invention.

Alternatively, multiple systems 1300 can be arranged in a sparse array and timing control methods used to steer their conducted acoustic waves such that they combine at a desired location within the ground. Such steering is essentially done in the same manner similar as overpressure waves are steered, as described in relation to FIGS. 9-11 except it is accomplished with multiple time-controlled conducted acoustic waves. FIG. 15 illustrates multiple systems 1300A-1300C being controlled such that the conducted acoustic waves travel through the ground via direct paths 904A-904C such that they combine at a point under ground 1502. The ability to focus and steer the conducted acoustic waves of the present invention enables precision imaging of features deep within the ground such as oil formation 1504. If the target media is water, beam steering can be used to chart the bottom of a water body.

FIG. 16 depicts an exemplary circular array pattern that can be used for beam steering purposes. Such patterns can be placed with larger arrays to provide a scalable architecture used to explore large areas. In FIG. 16, seismic systems 1300 are arrayed in circular sub-arrays 1602 which may themselves become part of a larger circular sub-array 1604, and so forth, to cover very large areas. Generally, the seismic systems 1300 of the present invention can be placed in any desirable and practical arrangement of known locations and used in accordance with the present invention.

Other Applications Enabled Using the Recoil Force of an Overpressure Wave

Other applications enabled using the recoil force of the overpressure wave of the present invention include but are not limited to powering an engine or a pump, driving fence posts/piles into the ground, use as a tamping device (e.g., to compact dirt), use as a forced entry device (like a battering ram), imaging a water body bottom, and use to crush/deform objects/stamp metal/etc.

Use of the Overpressure Wave Generator as a Shear Wave Generator for Seismic Exploration In a third embodiment of the invention, overpressure wave generator 11 is used as a shear wave generator for seismic exploration purposes. A shear wave, also known as S-wave, secondary wave or an elastic S-wave, is one of the two main types of elastic body waves, no named because, unlike surface waves, shear waves move through the body of an object. Seismic exploration system 1700 in accordance with the present invention is shown in FIG. 17A. Seismic exploration system 1700 includes an overpressure wave generator 11, a plane defining mechanism 1702, a coupling component 1312, a stabilizing mechanism 1313 for controlling the movement of the overpressure wave generator, a controller 1314 for controlling the operation of the overpressure wave generator 11, an echo detector 1316, a data recorder 1318, an image processor 1320, and a display device 1322. It should be understood that while the foregoing elements of the system 1300 are identified separately, these elements do not necessarily have to be physically separated. Some elements can be configured to reside on the same machine, for example, the controller 1314, the data recorder 1318, and the image processor 1320 can all be parts of a single computer. The system 1700 may optionally include a muffling apparatus 1324 which includes vent 1328 used to provide dilution gas (e.g., air) used to prevent detonation from continuing into the muffling apparatus 1324. Alternatively, the seismic exploration system 17000 can be operated without using coupling component 1312, in which case overpressure wave generator 11 and plane defining mechanism 1311 will be directly in contact with the ground 1330.

The overpressure wave generator 11 of system 1700 may include any of the variations described above. It includes an electrical (or laser) source for producing a spark, a detonation tube, a gas mixture source that provides the flowing gas into the detonation tube, and a detonator. For the purposes of the description below, the overpressure wave generator can alternatively be a group of detonation tubes that are detonated simultaneously so as to produce a combined overpressure wave.

The overpressure wave generator 11 is detonated to generate an overpressure wave. The generation of the overpressure wave causes a corresponding recoil force parallel to the ground causing plane defining mechanism 1311 to move across coupling component 1312. Plane defining mechanism 1311 is in contact with 1312 to define a plane across it perpendicular to the movement of overpressure wave generator 11. Coupling component 1312 couples the shear wave to the target media to produce a conducted acoustic wave. Stabilizing mechanism 1313 provides stability to the movement of the overpressure wave generator 11 essentially allowing only side to side movement. Coupling component 1312 may comprise a spring or may comprise rubber or some comparable compound having desired spring-like and damping characteristics.

FIG. 17B depicts a plane shear wave propagating from right to left as is produced given the orientation of the system 1700. Generally, the plane shear wave produced by system 1700 has the same directionality as the recoil force of the overpressure wave generator 11.

FIG. 18A depicts a plan view of a spherical shear wave generator 1800 in accordance with one embodiment of the present invention. As shown, two plane shear wave systems 1700A and 1700B are oriented such that the plane shear waves they produce are in opposite directions causing them to produce a spherical shear wave.

FIG. 18B depicts a spherical shear wave moving in a counterclockwise direction. Generally, the spherical shear wave produced by system 1800 is either clockwise or counterclockwise depending on the orientation of the systems 1700A and 1700B to each other.

FIG. 18C depicts a plan view of a spherical shear wave generator 1800 in accordance with another embodiment of the present invention. As shown, four plane shear wave systems 1700A-1700D are oriented such that the plane shear waves they produce are in opposite directions causing them to produce a spherical shear wave.

FIG. 18D depicts a plan view of a spherical shear wave generator 1800 in accordance with still another embodiment of the present invention. As shown, six plane shear wave systems 1700A-1700F are oriented such that the plane shear waves they produce are in opposite directions causing them to produce a spherical shear wave.

The various array techniques, coding techniques, etc. described in accordance with the second embodiment of the invention are also applicable with this third embodiment. As such, this embodiment also has the ability to focus and steer the conducted acoustic waves that enables precision imaging of features deep within the ground such as oil formation 1504. Similarly, this embodiment has the ability to image a water body bottom.

The improved seismic exploration system described herein was provided as an example of the types of applications that are enabled by the present invention. While particular embodiments and several exemplary applications (or implementations) of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements which embody the spirit and scope of the present invention.

The invention claimed is:

1. A method for generating a conducted acoustic wave, comprising the steps of:
    causing at least one detonation within at least one detonation tube having an open end to generate at least one overpressure wave; and
    coupling a recoil force of said at least one overpressure wave to a target media to generate at least one said conducted acoustic wave.

2. The method of claim 1, wherein said open end of said at least one detonation tube is oriented to direct said at least one overpressure wave perpendicular to and away from said target media.

3. The method of claim 1, wherein said open end of said at least one detonation tube is oriented to direct said at least one overpressure wave parallel to said target media.

4. The method of claim 3, wherein said recoil force corresponds to one of a plane shear wave or a spherical shear wave.

5. The method of claim 1, wherein said target media is at least one of ground, ice, or water.

6. The method of claim 1, wherein each of said at least one overpressure waves is generated by controlling, in accordance with detonation parameters, the detonation of a fuel-oxidant mixture flowing within each of said at least one detonation tube.

7. The method of claim 6, wherein said detonation parameters comprises a timing code.

8. The method of claim 7, wherein said timing code is a Barker code.

9. The method of claim 1, further comprising the step of:
    muffling the sound of said at least one overpressure wave.

10. The method of claim 1, further comprising the step of:
    steering a plurality of coupled acoustic waves of said at least one coupled acoustic wave to a location of interest within said target media by controlling the relative timing of the generation a plurality of overpressure waves of said at least one overpressure wave.

11. A system for generating a conducted acoustic wave, comprising:
    at least one detonation tube having an open end for generating at least one overpressure wave; and
    a coupling component for coupling a recoil force of said at least one overpressure wave to a target media to generate at least one said conducted acoustic wave.

12. The system of claim 11, further comprising a stabilizing mechanism that provides stability to the movement of the at least one detonation tube.

13. The system of claim 12, wherein said open end of said at least one detonation tube is oriented to direct said at least one overpressure wave perpendicular to and away from said target media and said stabilizing mechanism allows only up and down movement.

14. The system of claim 12, wherein said open end of said at least one detonation tube is oriented to direct said at least one overpressure wave parallel to said target media and said stabilizing mechanism allows only side to side movement.

15. The system of claim 11, wherein said target media is at least one of ground, ice, or water.

16. The system of claim 11, wherein each of said at least one overpressure waves is generated by controlling, in accordance with detonation parameters, the detonation of a fuel-oxidant mixture flowing within each of said at least one detonation tube.

17. The system of claim 16, wherein said detonation parameters comprises a timing code.

18. The system of claim 17, wherein said timing code is a Barker code.

19. The system of claim 11, further comprising:
   a muffler associated with said at least one detonation tube.

20. A system for generating and directing conducted acoustic waves, comprising:
   a plurality of overpressure wave generators positioned in a sparse array, each of said plurality of overpressure wave generators comprising at least one detonation tube having an open end and being used to generate a plurality of overpressure waves, each of said plurality of overpressure waves having a recoil force; and
   a plurality of coupling components for coupling said recoil forces of said plurality of overpressure waves to a target media to generate said conducted acoustic waves, said conducted acoustic waves being directed to a location of interest within said target media based upon the relative timing of the generation of said plurality of overpressure waves.

* * * * *